United States Patent
Paluri et al.

(10) Patent No.: US 12,041,233 B2
(45) Date of Patent: *Jul. 16, 2024

(54) PICTURE PARTITIONING-BASED CODING METHOD AND DEVICE

(71) Applicant: LG ELECTRONICS INC., Seoul (KR)

(72) Inventors: Seethal Paluri, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 72 days.

This patent is subject to a terminal disclaimer.

(21) Appl. No.: 17/900,408

(22) Filed: Aug. 31, 2022

(65) Prior Publication Data
US 2023/0038928 A1  Feb. 9, 2023

Related U.S. Application Data

(63) Continuation of application No. 17/495,718, filed on Oct. 6, 2021, now Pat. No. 11,470,315, which is a continuation of application No. PCT/KR2019/017994, filed on Dec. 18, 2019.

(60) Provisional application No. 62/831,128, filed on Apr. 8, 2019.

(51) Int. Cl.
*H04N 19/119* (2014.01)
*H04N 19/176* (2014.01)
*H04N 19/50* (2014.01)

(52) U.S. Cl.
CPC ......... *H04N 19/119* (2014.11); *H04N 19/176* (2014.11); *H04N 19/50* (2014.11)

(58) Field of Classification Search
CPC ..... H04N 19/119; H04N 19/176; H04N 19/50
See application file for complete search history.

(56) References Cited

U.S. PATENT DOCUMENTS

2015/0110201 A1* 4/2015 Sasai .................. H04N 19/436
375/240.26
2019/0082178 A1 3/2019 Kim et al.

FOREIGN PATENT DOCUMENTS

| KR | 10-2014-0057238 A | 5/2014 |
| KR | 10-2016-0095762 A | 8/2016 |
| KR | 10-2019-0024212 A | 3/2019 |
| WO | 2015/058719 A1 | 4/2015 |

* cited by examiner

*Primary Examiner* — Nam D Pham
(74) *Attorney, Agent, or Firm* — Bryan Cave Leighton Paisner LLP

(57) ABSTRACT

An image decoding method performed by a decoding device according to the present disclosure comprises the steps of: receiving a bitstream containing at least one of segmentation information of a current picture and prediction information for a current block included in the current picture; deriving a first segmentation structure of the current picture, which is based on multiple tiles, on the basis of the segmentation information of the current picture including at least one of information of the number of width-parsing columns, information of the last width, information of the number of height-parsing rows, and information of the last height; deriving a block predicted for the current block, on the basis of the prediction information for the current block contained in one of the multiple tiles; and generating reconstruction samples for the current block on the basis of the predicted block.

11 Claims, 15 Drawing Sheets

ENCODING APPARATUS

DECODING APPARATUS

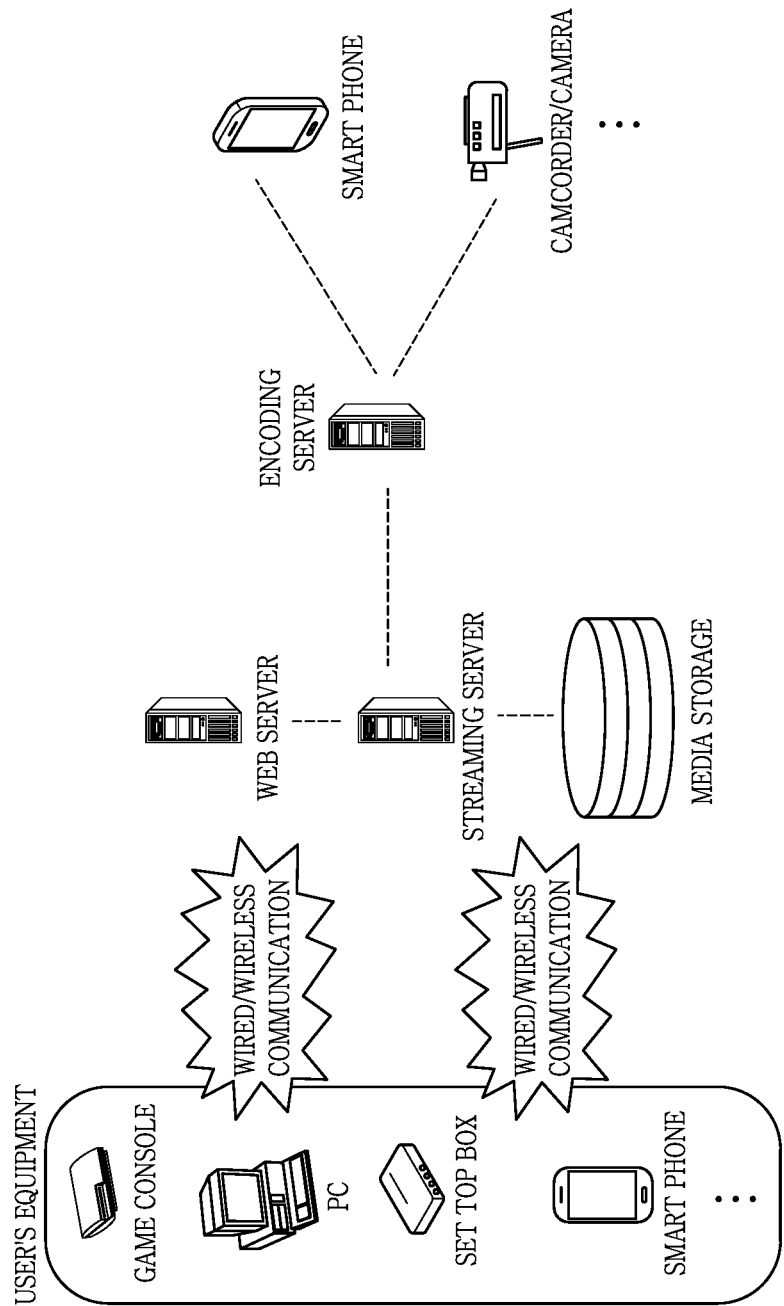

PICTURE PARTITIONING-BASED CODING METHOD AND DEVICE

This application is a Continuation Application of U.S. application Ser. No. 17/495,718, filed Oct. 6, 2021, which is a Continuation Application of International Application No. PCT/KR2019/017994, filed on Dec. 18, 2019, which claims the benefit of U.S. Provisional Application No. 62/831,128, filed on Apr. 8, 2019, the contents of which are all hereby incorporated by reference herein in their entirety.

BACKGROUND OF DISCLOSURE

Field of the Disclosure

The present disclosure relates to an image coding technology and, more particularly, to a picture partitioning-based coding method and apparatus in an image coding system.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

This disclosure is to provide a method and apparatus for improving image coding efficiency.

This disclosure is also to provide a method and apparatus for signaling partitioning information.

This disclosure is still also to provide a picture partitioning method and apparatus based on signaled information.

This disclosure is still also to provide a method and apparatus which partition a current picture, based on partition information for the current picture.

This disclosure is still also to provide a method and apparatus which determine the width (or height) of each of length parsing skip tiles among a plurality of tiles constituting a current picture, whose information on width and height is not parsed, based on the last width (or height) among the signaled widths (or heights).

According to an embodiment of this disclosure, an image decoding method performed by a decoding apparatus is provided. The method includes receiving a bitstream including at least one of a partition information for a current picture and a prediction information for a current block included in the current picture, deriving a first partitioning structure of the current picture, based on the partition information for the current picture, wherein the first partitioning structure of the current picture is based on a plurality of tiles, and wherein the partition information for the current picture includes at least one of information on a number of width parsing columns among a plurality of columns for deriving the first partitioning structure, whose information on width is parsed, information on a last width indicating a width among the widths of the width parsing columns, which is parsed last, information on a number of height parsing rows among a plurality of rows for deriving the first partitioning structure, whose information on height is parsed, and information on a last height indicating a height among the heights of the height parsing rows, which is parsed last, deriving a predicted block for the current block, based on the prediction information for the current block included in one tile of the plurality of tiles, and generating reconstructed samples for the current block, based on the predicted block.

According to another embodiment of this disclosure, a decoding apparatus for performing image decoding is provided. The decoding apparatus includes an entropy decoder which receives a bitstream including at least one of a partition information for a current picture and a prediction information for a current block included in the current picture, and derives a first partitioning structure of the current picture, based on the partition information for the current picture, wherein the first partitioning structure of the current picture is based on a plurality of tiles, and wherein the partition information for the current picture includes at least one of information on a number of width parsing columns among a plurality of columns for deriving the first partitioning structure, whose information on width is parsed, information on a last width indicating a width among the widths of the width parsing columns, which is parsed last, information on a number of height parsing rows among a plurality of rows for deriving the first partitioning structure, whose information on height is parsed, and information on a last height indicating a height among the heights of the height parsing rows, which is parsed last, a predictor which derives a predicted block for the current block, based on the prediction information for the current block included in one tile of the plurality of tiles, and an adder which generates reconstructed samples for the current block, based on the predicted block.

According to still another embodiment of this disclosure, an image encoding method performed by an encoding apparatus is provided. The method includes partitioning a current picture into a plurality of tiles, generating a partition information for the current picture, based on the plurality of tiles, wherein the partition information for the current picture includes at least one of information on a number of width parsing columns among a plurality of columns for deriving the plurality of tile, whose information on width is parsed, information on a last width indicating a width among the widths of the width parsing columns, which is parsed last, information on a number of height parsing rows among a plurality of rows for deriving the plurality of tiles, whose information on height is parsed, and information on a last height indicating a height among the heights of the height parsing rows, which is parsed last, deriving a predicted block for a current block included in one tile of the plurality of tiles, generating a prediction information for the current block, based on the predicted block, and encoding image information including at least one of the partition information for the current picture and the prediction information for the current block.

According to still another embodiment of this disclosure, an encoding apparatus for performing image encoding is provided. The encoding apparatus includes an image partitioner which partitions a current picture into a plurality of tiles, and generates a partition information for the current picture, based on the plurality of tiles, wherein the partition information for the current picture includes at least one of information on a number of width parsing columns among a plurality of columns for deriving the plurality of tile, whose information on width is parsed, information on a last width indicating a width among the widths of the width parsing columns, which is parsed last, information on a number of height parsing rows among a plurality of rows for deriving the plurality of tiles, whose information on height is parsed, and information on a last height indicating a height among the heights of the height parsing rows, which is parsed last, a predictor which derives a predicted block for a current block included in one tile of the plurality of tiles, generates a prediction information for the current block, based on the predicted block, and an entropy encoder which encodes image information including at least one of the partition information for the current picture and the prediction information for the current block.

According to still another embodiment of this disclosure, there is provided a decoder-readable storage medium which stores information on instructions that cause a video decoding apparatus to perform decoding methods according to some embodiments.

According to still another embodiment of this disclosure, there is provided a decoder-readable storage medium which stores information on instructions that cause a video decoding apparatus to perform decoding method according to an embodiment. The decoding method according to the embodiment includes receiving a bitstream including at least one of a partition information for a current picture and a prediction information for a current block included in the current picture, deriving a first partitioning structure of the current picture, based on the partition information for the current picture, wherein the first partitioning structure of the current picture is based on a plurality of tiles, and wherein the partition information for the current picture includes at least one of information on a number of width parsing columns among a plurality of columns for deriving the first partitioning structure, whose information on width is parsed, information on a last width indicating a width among the widths of the width parsing columns, which is parsed last, information on a number of height parsing rows among a plurality of rows for deriving the first partitioning structure, whose information on height is parsed, and information on a last height indicating a height among the heights of the height parsing rows, which is parsed last, deriving a predicted block for the current block, based on the prediction information for the current block included in one tile of the plurality of tiles, and generating reconstructed samples for the current block, based on the predicted block.

According to this disclosure, it is possible to improve overall image/video compression efficiency.

According to this disclosure, it is possible to increase the efficiency of picture partitioning.

According to this disclosure, it is possible to increase the efficiency of picture partitioning, based on the partition information for the current picture.

According to this disclosure, it is possible to improve signaling efficiency for picture partitioning by determining the width (or height) of each of length parsing skip tiles among a plurality of tiles constituting the current picture, whose information on width and height is not parsed, based on the last width (or height) among the signaled widths (or heights).

BRIEF DESCRIPTION OF THE DRAWINGS

FIG. 15 represents an example of a content streaming system to which the disclosure of this document is applicable.

DESCRIPTION OF EMBODIMENTS

Figure 1:
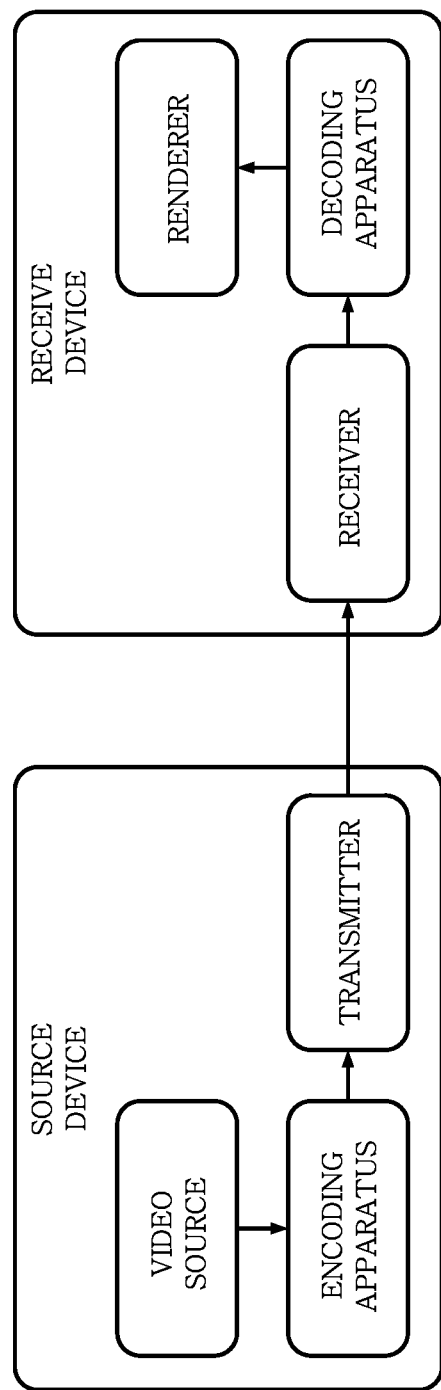
FIG. 1 schematically illustrates an example of a video/image coding system to which the present disclosure may be applied.

According to an embodiment of this disclosure, an image decoding method performed by a decoding apparatus is provided. The method includes receiving a bitstream including at least one of a partition information for a current picture and a prediction information for a current block included in the current picture, deriving a first partitioning structure of the current picture, based on the partition information for the current picture, wherein the first partitioning structure of the current picture is based on a plurality of tiles, and wherein the partition information for the current picture includes at least one of information on a number of width parsing columns among a plurality of columns for deriving the first partitioning structure, whose information on width is parsed, information on a last width indicating a width among the widths of the width parsing columns, which is parsed last, information on a number of height parsing rows among a plurality of rows for deriving the first partitioning structure, whose information on height is parsed, and information on a last height indicating a height among the heights of the height parsing rows, which is parsed last, deriving a predicted block for the current block, based on the prediction information for the current block included in one tile of the plurality of tiles, and generating reconstructed samples for the current block, based on the predicted block.

The present disclosure may be modified in various forms, and specific embodiments thereof will be described and illustrated in the drawings. However, the embodiments are not intended for limiting the present disclosure. The terms used in the following description are used to merely describe specific embodiments, but are not intended to limit the present disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

In addition, each configuration of the drawings described in the present disclosure is an independent illustration for explaining functions as features that are different from each other, and does not mean that each configuration is implemented by mutually different hardware or different software. For example, two or more of the configurations can be combined to form one configuration, and one configuration can also be divided into multiple configurations. Without departing from the gist of the present disclosure, embodiments in which configurations are combined and/or separated are included in the scope of the present disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 illustrates an example of a video/image coding system to which the present disclosure may be applied.

The present disclosure relates to video/image coding. For example, a method/embodiment disclosed in the present disclosure may be applied to a method disclosed in the versatile video coding (VVC) standard, the essential video coding (EVC) standard, the AOMedia Video 1 (AV1) standard, the 2nd generation of audio video coding standard (AVS2) or the next generation video/image coding standard (e.g., H.267, H.268, or the like).

The present disclosure suggests various embodiments of video/image coding, and the above embodiments may also be performed in combination with each other unless otherwise specified.

In the present disclosure, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture (a brick may represent a rectangular region of CTU rows within a tile in a picture). A tile may be partitioned into a multiple bricks, each of which may be constructed with one or more CTU rows within the tile (A tile may be partitioned into multiple bricks, each of which consisting of one or more CTU rows within the tile). A tile that is not partitioned into multiple bricks may also be referred to as a brick. A brick scan may represent a specific sequential ordering of CTUs partitioning a picture, wherein the CTUs may be ordered in a CTU raster scan within a brick, and bricks within a tile may be ordered consecutively in a raster scan of the bricks of the tile, and tiles in a picture may be ordered consecutively in a raster scan of the tiles of the picture (A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture). A tile is a particular tile column and a rectangular region of CTUs within a particular tile column (A tile is a rectangular region of CTUs within a particular tile column and a particular tile row in a picture). The tile column is a rectangular region of CTUs, which has a height equal to the height of the picture and a width that may be specified by syntax elements in the picture parameter set (The tile column is a rectangular region of CTUs having a height equal to the height of the picture and a width specified by syntax elements in the picture parameter set). The tile row is a rectangular region of CTUs, which has a width specified by syntax elements in the picture parameter set and a height that may be equal to the height of the picture (The tile row is a rectangular region of CTUs having a height specified by syntax elements in the picture parameter set and a width equal to the width of the picture). A tile scan may represent a specific sequential ordering of CTUs partitioning a picture, and the CTUs may be ordered consecutively in a CTU raster scan in a tile, and tiles in a picture may be ordered consecutively in a raster scan of the tiles of the picture (A tile scan is a specific sequential ordering of CTUs partitioning a picture in which the CTUs are ordered consecutively in CTU raster scan in a tile whereas tiles in a picture are ordered consecutively in a raster scan of the tiles of the picture). A slice may include an integer number of bricks of a picture, and the integer number of bricks may be included in a single NAL unit (A slice includes an integer number of bricks of a picture that may be exclusively contained in a single NAL unit). A slice may be constructed with multiple complete tiles, or may be a consecutive sequence of complete bricks of one tile (A slice may consists of either a number of complete tiles or only a consecutive sequence of complete bricks of one tile). In the present disclosure, a tile group and a slice may be used in place of each other. For example, in the present disclosure, a tile group/tile group header may be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
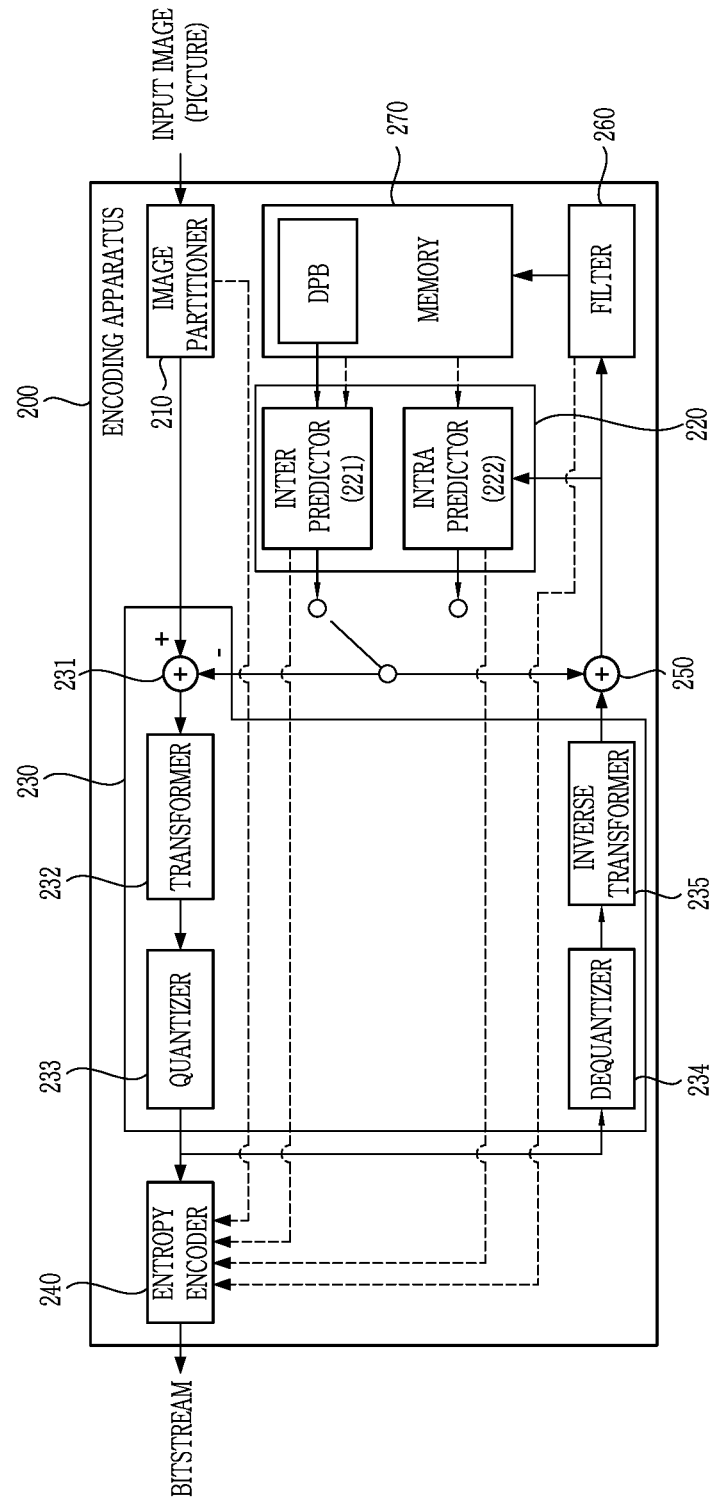
FIG. 2 is a diagram schematically illustrating a configuration of a video/image encoding apparatus to which the present disclosure may be applied.

FIG. 2 is a diagram schematically illustrating a configuration of a video/image encoding apparatus to which the present disclosure may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, as illustrated, the unit for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 240 as described later in the description of each prediction mode. The information about prediction may be encoded by the entropy encoder 240 to be output in a form of the bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 200 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, a sample value in a picture may be signaled based on information on a palette index and a palette table.

The predicted signal generated through the predictor (including the inter predictor 221 and/or the intra predictor 222) may be used to generate a reconstructed signal or used to generate a residual signal. The transformer 232 may generate transform coefficients by applying the transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, when the relationship information between pixels is illustrated as a graph, the GBT means the transform obtained from the graph. The CNT means the transform which is acquired based on a predicted signal generated by using all previously reconstructed pixels. In addition, the transform process may also be applied to a pixel block having the same size of the square, and may also be applied to the block having a variable size rather than the square.

The quantizer 233 may quantize the transform coefficients to transmit the quantized transform coefficients to the entropy encoder 240, and the entropy encoder 240 may encode the quantized signal (information about the quantized transform coefficients) to the encoded quantized signal to the bitstream. The information about the quantized transform coefficients may be called residual information. The quantizer 233 may rearrange the quantized transform coefficients having a block form in a one-dimensional vector form based on a coefficient scan order, and also generate the information about the quantized transform coefficients based on the quantized transform coefficients of the one dimensional vector form. The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in the present disclosure may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various kinds of filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
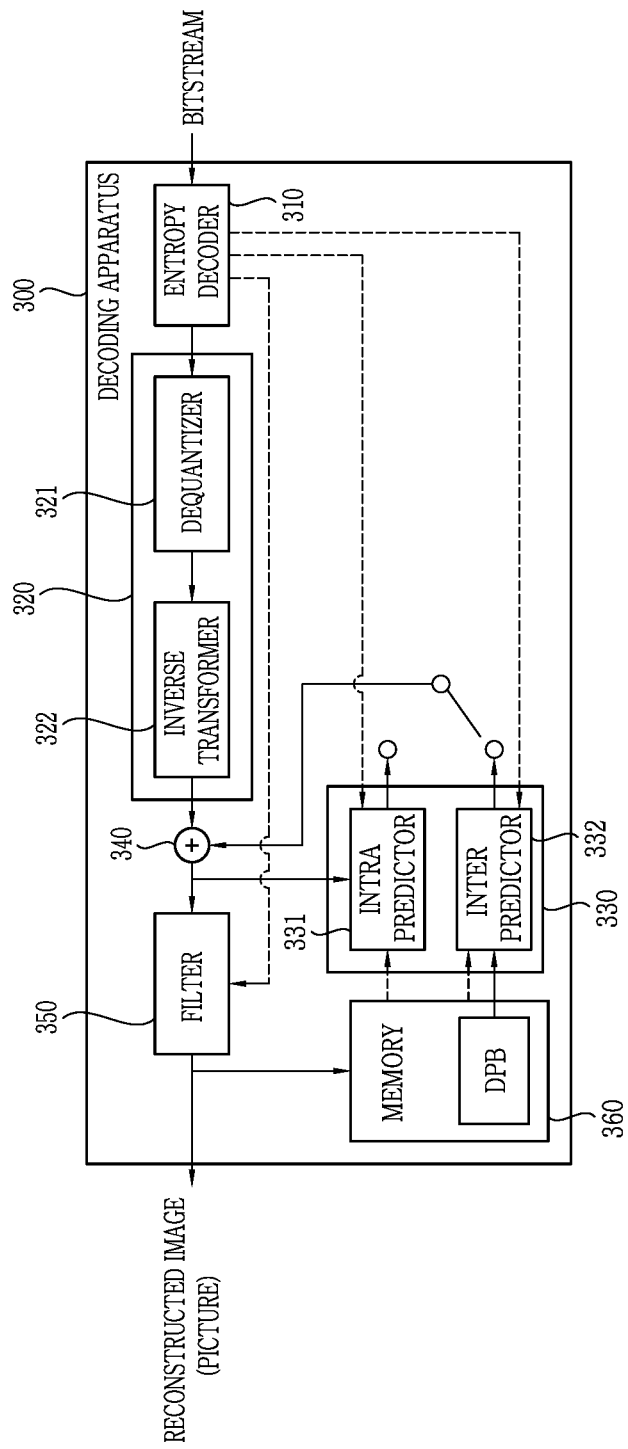
FIG. 3 is a diagram for schematically explaining a configuration of a video/image decoding apparatus to which the present disclosure may be applied.

FIG. 3 is a diagram for schematically explaining a configuration of a video/image decoding apparatus to which the present disclosure is applicable.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in the present disclosure may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, and residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to the present disclosure may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present specification, the exemplary embodiments described in the filter 260, the inter predictor 221, and the intra predictor 222 of the encoding apparatus 200 may be applied equally to or to correspond to the filter 350, the inter predictor 332, and the intra predictor 331 of the decoding apparatus 300, respectively.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Figure 4:
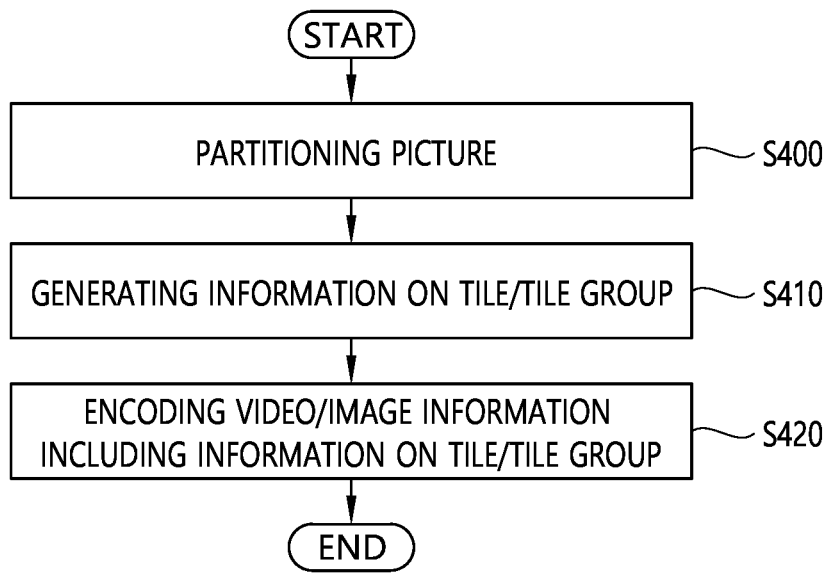
FIG. 4 is a flowchart showing a picture encoding procedure based on a tile and/or a tile group according to an embodiment.

FIG. 4 is a flowchart showing a picture encoding procedure based on a tile and/or a tile group according to an embodiment.

In this specification, the term "tile" may refer to a set of CTUs of a rectangular region within a specific tile column and a specific tile row within a picture. In an example, a tile may represent a set of bricks or a set of slices.

In this specification, the term "slice" may refer to a set of an integer number of bricks in a picture included in a single NAL unit. In an example, a slice may represent a set of tiles.

In this specification, the term "brick" may represent CTU rows of a rectangular region included in a tile or slice within a picture.

However, in some embodiments, the meanings of the tile, slice, and brick may be used interchangeably. Those skilled in the relevant art will understand with ease that the tiles, slices, and bricks are used to distinguish units for partitioning a current picture, such as a first partition unit, a second partition unit, and a third partition unit, respectively, and that there is no need for them to be interpreted strictly limited by the definition according to each name.

In an embodiment, picture partitioning (S400) and generation of information about the tile/tile group (S410) may be performed by the image partitioner 210 of the encoding apparatus, and encoding of video/image information including information on a tile/tile group (S420) may be performed by the entropy encoder 240 of the encoding apparatus.

The encoding apparatus according to an embodiment may perform picture partitioning for encoding an input picture (S400). The picture may include one or more tiles/tile groups. The encoding apparatus may partition a picture into various forms under the consideration of image characteristics and coding efficiency of the picture, and may generate information indicating a partitioning form having an optimal coding efficiency and signal it to the decoding apparatus.

The encoding apparatus according to an embodiment may determine a tile/tile group to be applied to the picture, and may generate information on the tile/tile group (S410). The information on the tile/tile group may include information indicating the structure of the tile/tile group for the picture. The information on the tile/tile group may be signaled through various parameter sets and/or tile group headers, as will be described later. Specific examples will be described later.

The encoding apparatus according to an embodiment may encode video/image information including information on the tile/tile group, and may output the encoded video/image information in the form of a bitstream (S420). The bitstream may be transferred to the decoding apparatus through a digital storage medium or a network. The video/image information may include HLS and/or tile group header syntax described in this document. In addition, the video/image information may further include the aforementioned prediction information, residual information, (in-loop) filtering information, or the like. For example, the encoding apparatus may apply in-loop filtering after reconstructing the current picture, encode parameters related to the in-loop filtering, and output the encoded parameters in the form of a bitstream.

Also, the information on the tile/tile group may further include information on a brick, as will be described later.

Figure 5:
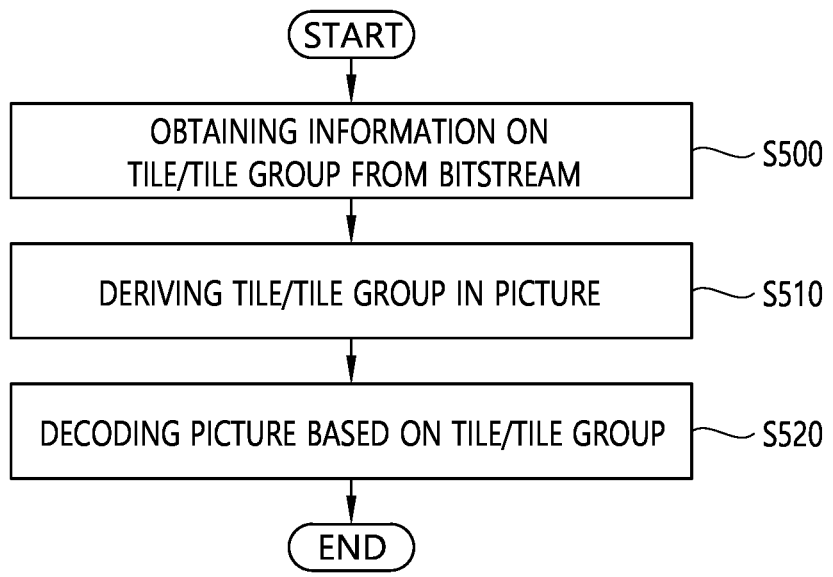
FIG. 5 is a flowchart showing a picture decoding procedure based on a tile and/or a tile group according to an embodiment.

FIG. 5 is a flowchart showing a picture decoding procedure based on a tile and/or a tile group according to an embodiment.

In an embodiment, obtaining information on a tile/tile group from a bitstream (S500), deriving a tile/tile group in a picture (S510), and performing picture decoding based on the tile/tile group (S520) may be performed by the entropy decoder 310 of the decoding apparatus, and encoding video/image information including information on a tile/tile group (S530) may be performed by the sample decoder of the decoding apparatus.

The decoding apparatus according to an embodiment may obtain information on a tile/tile group from the received bitstream (S500). The information on the tile/tile group may be obtained through various parameter sets and/or tile group headers, as will be described later. Specific examples will be described later. Also, the information on the tile/tile group may further include information on a brick, as will be described later.

The decoding apparatus according to an embodiment may derive a tile/tile group in the current picture, based on the information on the tile/tile group (S510). Also, the decoding apparatus may derive the brick.

The decoding apparatus according to an embodiment may decode the current picture, based on the tile/tile group (S520). For example, the decoding apparatus may derives a brick/CTU/CU located in the tile, and perform based on this, inter/intra prediction, residual processing, reconstructed block (picture) generation, and/or in-loop filtering procedures. Further, in this case, for example, the decoding apparatus may initialize the context model/information in units of tiles/tile groups. Also, when the neighboring block or neighboring sample to which reference is made during inter/intra prediction is located in a different tile from the current tile in which the current block is located, the decoding apparatus may treat the neighboring block or neighboring sample as unavailable.

Figure 6:
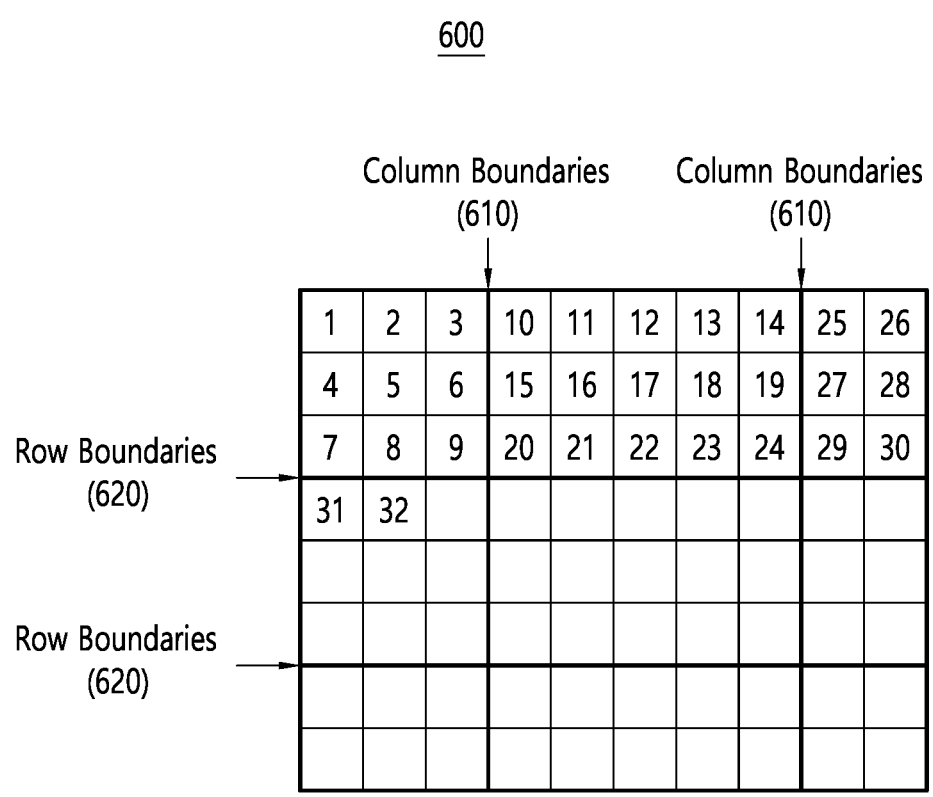
FIG. 6 is a diagram showing an example of partitioning a picture in units of tiles.

FIG. 6 is a diagram showing an example of partitioning a picture in units of tiles.

In this application, a specific term or sentence is used for defining a specific information or concept. For example, information on the number of height parsing rows among a plurality of rows for deriving a specific partitioning structure for partitioning a current picture into a plurality of tiles, whose information on height is parsed is represented as "num_tile_rows_minus1"; information on the number of width parsing rows among a plurality of rows for deriving a specific partitioning structure for partitioning a current picture into a plurality of tiles, whose information on width is parsed is represented as "numtile_columns_minus1"; the width among the widths of the width parsing columns, which is parsed last is represented as "last width"; and the height among the heights of the height parsing columns, which is parsed last is represented as "last height".

However, "num_tile_rows_minus1" may be replaced with various terms such as numexp_tile_rows_minus1, and the like; "numtile_columns_minus1" may be replaced with various terms such as num_exp_tile_columns_minus1, and the like; "last with" may be replaced with last_width, LastWidth, and the like; and "last height" may be replaced with various terms such as last_height, LastHeight, and the like. Therefore, when interpreting specific terms or sentences used to define specific information or concepts herein throughout the description, interpretations limited to the names should not be made, and the term needs to be interpreted under the consideration of various operations, functions, and effects according to the contents which the term intends to express.

In an embodiment, tiles may refer to regions within a picture defined by a set of vertical and/or horizontal boundaries that partition the picture into a plurality of rectangles. FIG. 6 shows an example in which a picture 600 is partitioned into a plurality of tiles, based on a plurality of column boundaries 610 and row boundaries 620 therein. In FIG. 6, the first 32 largest coding units (or coding tree units (CTUs)) are numbered and shown.

In an embodiment, each tile may include an integer number of CTUs which are processed in a raster scan order within each tile. In this case, a plurality of tiles in the picture, which include the respective tiles may also be processed in the raster scan order in the picture. The tiles may be grouped to form tile groups, and tiles within a single tile group may be raster scanned. Partitioning a picture into tiles may be defined based on syntax and semantics of a picture parameter set (PPS).

In an embodiment, information derived from the PPS regarding tiles may be used to check (or read) the followings. First it may be checked whether there is one tile or there is/are one or more tiles in the picture, and when there is/are one or more tiles, it may be checked whether or not the one or more tiles are uniformly distributed, the dimension of the tiles may be checked, and it may be checked whether the loop filter is enabled.

In an embodiment, the PPS may signal the syntax element single_tile_in_pic_flag first. The single_tile_in_pic_flag may indicate whether there is only one tile in the picture or there are a plurality of tiles in the picture. When there are a plurality of tiles in the picture, the decoding apparatus may parse information on the number of tile rows and information on the number of tile columns by using syntax elements num_tile_columns_minus1 and num_tile_rows_minus1. The syntax elements num_tile_columns_minus1 and num_tile_rows_minus1 may specify a process of partitioning a picture into tile rows and columns. The heights of the tile rows and the widths of the tile columns may be represented in terms of CTBs (i.e., in units of CTBs).

In an embodiment, an additional flag may be parsed to check whether or not tiles in a picture are uniformly spaced. When tiles in the picture are not uniformly spaced, the number of CTBs per tile for the boundaries of each tile row and column may be explicitly signaled (i.e., the number of CTBs in each tile row and the number of CTBs in each tile column may be signaled). If the tiles are uniformly spaced, the tiles may have the same width and height as each other.

In an embodiment, another flag (e.g., the syntax element loop_filter_across_tiles_enabled_flag) may be parsed to determine whether or not a loop filter is enabled for tile boundaries. Table 1 below summarizes and shows examples of main information on tiles that can be derived by parsing the PPS. Table 1 may represent PPS RBSP syntax.

TABLE 1

| pic_parameter_set_rbsp( ) { | Descriptor |
|---|---|
| ... | |
| single_tile_in_pic_flag | u(1) |
| entropy_coding_sync_enabled_flag | u(1) |
| if( !single_tile_in_pic_flag ) { | |
| num_tile_columns_minus1 | ue(v) |
| num_tile_rows_minus1 | ue(v) |
| uniform_spacing_flag | u(1) |
| if( !uniform_spacing_flag ) { | |
| for( i = 0; i < num_tile_columns_minus1; i++ ) | |
| column_width_minus1[ i ] | ue(v) |
| for( i = 0; i < num_tile_rows_minus1; i++ ) | |
| row_height_minus1[ i ] | ue(v) |
| } | |
| loop_filter_across_tiles_enabled_flag | u(1) |
| } | |
| ... | u(1) |

Examples of semantics for the syntax elements written in Table 1 may be, for example, as in Table 2 below.

TABLE 2 single_tile_in_pic_flag equal to 1 specifies that there is only one tile in each picture referring to the PPS. single_tile_in_pic_flag to equal to 0 specifies that there is more than one tile in each picture referring to the PPS. It is a requirement of bitstream conformance that the value of single_tile_in_pic_flag shall be the same for all PPSs that are activated within a CVS.

TABLE 2-continued num_tile_columns_minus1 plus 1 specifies the number of tile columns partitioning
the picture. num_tile_columns_minus1 shall be in the range of 0 to PicWidthInCtbsY − 1,
inclusive. When not present, the value of num_tile_columns_minus1 is inferred to
be equal to 0.
num_tile_rows_minus1 plus 1 specifies the number of tile rows partitioning the
picture. num_tile_rows_minus1 shall be in the range of 0 to PicHeightInCtbsY − 1,
inclusive. When not present, the value of num_tile_rows_minus1 is inferred to be
equal to 0.
The variable NumTilesInPic is set equal to
( num_tile_columns_minus1 + 1 ) * ( num_tile_rows_minus1 + 1 ).When
single_tile_in_pic_flag is equal to 0, NumTilesInPic shall be greater than 1.
uniform_tile_spacing_flag equal to 1 specifies that tile column boundaries and
likewise tile row boundaries are distributed uniformly across the picture.
uniform_tile_spacing_flag equal to 0 specifies that tile column boundaries and
likewise tile row boundaries are not distributed uniformly across the picture but
signalled explicitly using the syntax elements tile_column_width_minus1[ i ] and
tile_row_height_minus1[ i ]. When not present, the value of
uniform_tile_spacing_flag is inferred to be equal to 1.
tile_column_width_minus1[ i ] plus 1 specifies the width of the i-th tile column in
units of CTBs.
tile_row_height_minus1[ i ] plus 1 specifies the height of the i-th tile row in units of
CTBs.
loop_filter_across_tiles_enabled_flag equal to 1 specifies that in-loop filtering
operations may be performed across tile boundaries in pictures referring to the PPS.
loop_filter_across_tiles_enabled_flag equal to 0 specifies that in-loop filtering
operations are not performed across tile boundaries in pictures referring to the PPS.
The in-loop filtering operations include the deblocking filter, sample adaptive offset
filter, and adaptive loop filter operations. When not present, the value of
loop_filter_across_tiles_enabled_flag is inferred to be equal to 1.

Figure 7:
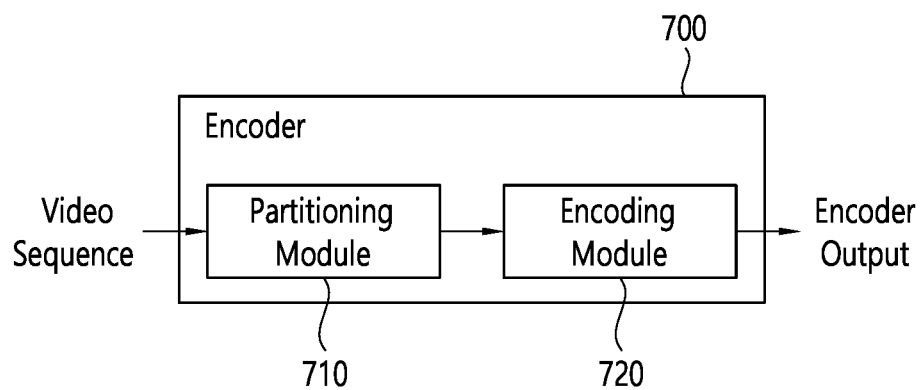
FIG. 7 is a block diagram showing a configuration of an encoding apparatus according to an embodiment.
Figure 8:
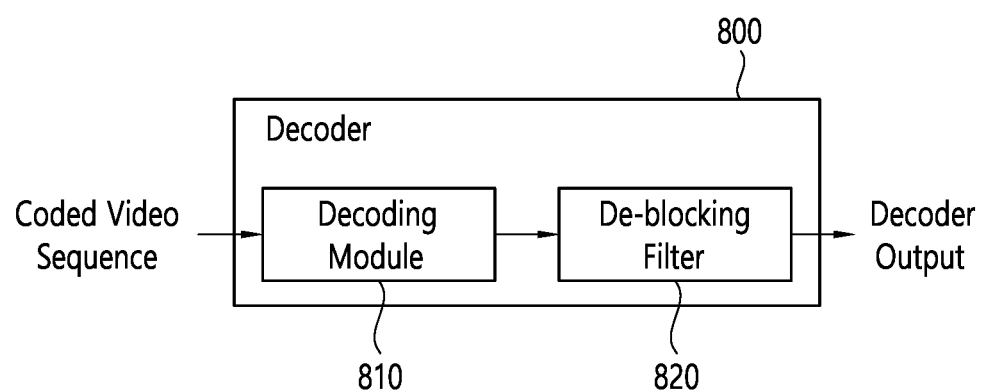
FIG. 8 is a flowchart showing a configuration of a decoding apparatus according to an embodiment.

FIG. 7 is a block diagram showing a configuration of an encoding apparatus according to an embodiment, and FIG. 8 is a flowchart showing a configuration of a decoding apparatus according to an embodiment.

FIG. 7 shows an example of a block diagram of an encoding apparatus. The encoding apparatus 700 shown in FIG. 7 includes a partitioning module 710 and an encoding module 720. The partitioning module 710 may perform the same and/or similar operations to those of the image divider 210 of the encoding apparatus shown in FIG. 2, and the encoding module 720 may perform the same and/or similar operations to those of the entropy encoder 240 of the encoding apparatus shown in FIG. 2. The input video may be partitioned in the partitioning module 710, and then encoded in the encoding module 720. After being encoded, the encoded video may be output from the encoding apparatus 700.

FIG. 8 shows an example of a block diagram of a decoding apparatus. The decoding apparatus 800 shown in FIG. 8 includes a decoding module 810 and a de-blocking filter 820. The decoding module 810 may perform the same and/or similar operations to those of the entropy decoder 310 of the decoding apparatus shown in FIG. 3, and the de-blocking filter 820 may perform the same and/or similar operations to those of the filter 350 of the decoding apparatus shown in FIG. 3. The decoding module 810 may decode the input received from the encoding apparatus 700, and derive information on tiles. A processing unit may be determined based on the decoded information, and the de-blocking filter 820 may process the processing unit by applying an in-loop de-blocking filter. In-loop filtering may be applied to remove coding artifacts generated in the partitioning process. The in-loop filtering operation may include an adaptive loop filter (ALF), a de-blocking filter (DF), a sample adaptive offset (SAO), and the like. Thereafter, the decoded picture may be output.

An example of a descriptor specifying the parsing process of each syntax element is shown in Table 3 below.

TABLE 3 ae(v): context-adaptive arithmetic entropy-coded syntax element.
b(8): byte having any pattern of bit string (8 bits). The parsing process for this
descriptor is specified by the return value of the function read_bits( 8 ).
f(n): fixed-pattern bit string using n bits written (from left to right) with the left bit
first. The parsing process for this descriptor is specified by the return value of the
function read_bits( n ).
i(n): signed integer using n bits. When n is "v" in the syntax table, the number of bits
varies in a manner dependent on the value of other syntax elements. The parsing
process for this descriptor is specified by the return value of the function
read_bits( n ) interpreted as a two's complement integer representation with most
significant bit written first.
se(v): signed integer 0-th order Exp-Golomb-coded syntax element with the left bit
first. The parsing process for this descriptor is specified with the order k equal to 0.
st(v): null-terminated string encoded as universal coded character set (UCS)
transmission format-8 (UTF-8) characters as specified in ISO/IEC 10646. The parsing
process is specified as follows: st(v) begins at a byte-aligned position in the bitstream
and reads and returns a series of bytes from the bitstream, beginning at the current
position and continuing up to but not including the next byte-aligned byte that is equal
to 0x00, and advances the bitstream pointer by ( stringLength + 1 ) * 8 bit
positions, where stringLength is equal to the number of bytes returned.NOTE - The
st(v) syntax descriptor is only used in this Specification when the current position in TABLE 3-continued the bitstream is a byte-aligned position.ib(v): truncated binary using up to maxVal bits
with maxVal defined is the semantics of the syntax element.
tu(v): truncated unary using up to maxVal bits with maxVal defined in the semantics
of the symtax element.
u(n): unsigned integer using n bits. When n is "v" in the syntax table, the number of
bits varies in a manner dependent on the value of other syntax elements. The parsing
process for this descriptor is specified by the return value of the function
read_bits( n ) interpreted as a binary representation of an unsigned integer with most
significant bit written first.
ue(v): unsigned integer 0-th order Exp-Golomb-coded syntax element with the left bit
first. The parsing process for this descriptor is specified with the order k equal to 0.
uek(v): unsigned integer k-th order Exp-Golomb-coded syntax element with the left
bit first. The parsing process for this descriptor is specified with the order k defined in
the semantics of the symtax element.

Figure 9:
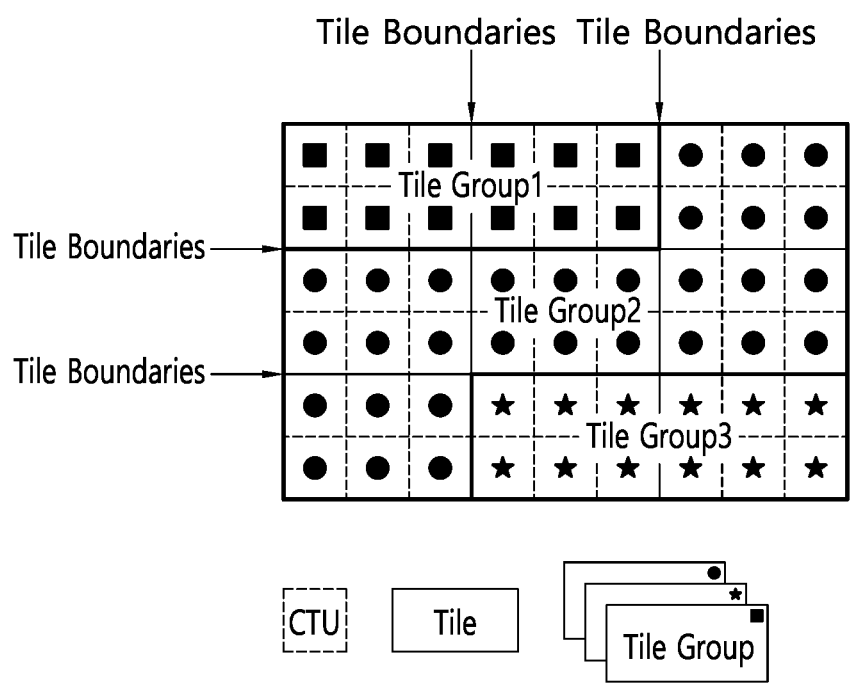
FIG. 9 is a diagram showing an example of a tile and a tile group unit constituting a current picture.

FIG. 9 is a diagram showing an example of a tile and a tile group unit constituting a current picture.

As described above, tiles may be grouped to form tile groups. FIG. 9 shows an example in which one picture is partitioned into tiles and tile groups. In FIG. 9, the picture includes 9 tiles and 3 tile groups. Each of the tile groups may be independently coded.

Figure 10:
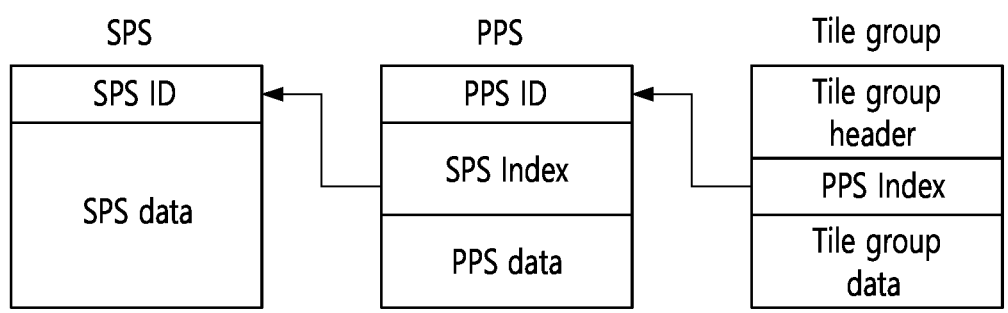
FIG. 10 is a diagram schematically showing an example of a signaling structure of tile group information.

FIG. 10 is a diagram schematically showing an example of a signaling structure of tile group information.

Each of the tile groups may include a tile group header in a Coded Video Sequence (CVS). Tile groups may represent a meaning similar to that of a slice group. Each of the tile groups may be independently coded. A tile group may include one or more tiles. The tile group header may make reference to a PPS, and subsequently, the PPS may make reference to a sequence parameter set (SPS).

In FIG. 10, the tile group header may have a PPS index of the PPS to which the tile group header makes reference. Subsequently, the PPS may make reference to the SPS.

In addition to the PPS index, the tile group header according to an embodiment may be determined for the following information. First, if there are more than one tiles per picture, the tile group address and the number of the tiles in the tile group may be determined. Next, a tile group type may be determined as intra/predictive/bi-directional. Then, a Picture Order Count (POC) of Lease Significant Bits (LSBs) may be determined. Next, if there are more than one tiles in one picture, the offset length and entry point to the tile may be determined.

Table 4 below shows an example of syntax of a tile group header.

TABLE 4

| tile_group_header( ) { | Descriptor |
|---|---|
| tile_group_pic_parameter_set_id | ue(v) |
| if( NumTilesInPic > 1 ) { | |
| tile_group_address | u(v) |
| num_tiles_in_tile_group_minus1 | ue(v) |
| } | |
| tile_group_type | ue(v) |
| tile_group_pic_order_cnt_lsb | u(v) |
| if( partition_constraints_override_enabled_flag ) { | |
| partition_constraints_override_flag | ue(v) |
| ... | |
| if( num_tiles_in_tile_group_minus1 > 0 ) { | |
| offset_len_minus1 | ue(v) |
| for( i = 0; i < num_tiles_in_tile_group_minus1; i++ ) | |
| entry_point_offset_minus1[ i ] | u(v) |
| } | |
| byte_alignment( ) | |
| } | |

The following shows an example of English semantics for the syntax of the tile group header.

<English Semantics for Syntax of Tile Group Header>

When present, the value of the tile group header syntax element tile_group_pic_parameter_set_id and tile_group_pic_order_cnt_lsb shall be the same in all tile group headers of a coded picture.

tile_group_pic_parameter_set_id specifies the value of pps_pic_parameter_set_id for the PPS in use. The value of tile_group_pic_parameter_set_id shall be in the range of 0 to 63, inclusive.

It is a requirement of bitstream conformance that the value of TemporalId of the current picture shall be greater than or equal to the value of TemporalId of the PPS that has pps_pic_parameter_set_id equal to tile_group_pic_parameter_set_id.

tile_group_address specifies the tile address of the first tile in the tile group, where tile address is the tile ID. The length of tile_group_address is Ceil(Log 2 (NumTilesInPic)) bits. The value of tile_group_address shall be in the range of 0 to NumTilesInPic−1, inclusive, and the value of tile_group_address shall not be equal to the value of tile_group_address of any other coded tile group NAL unit of the same coded picture. When tile_group_address is not present it is inferred to be equal to 0.

num_tiles_in_tile_group_minus1 plus 1 specifies the number of tiles in the tile group.

The value of num_tiles_in_tile_group_minus1 shall be in the range of 0 to NumTilesInPic−1, inclusive. When not present, the value of num_tiles_in_tile_group_minus1 is inferred to be equal to 0.

tile_group_type specifies the coding type of the tile group according to Table 5.

TABLE 5

| tile_group_type | Name of tile_group_type |
|---|---|
| 0 | B (B tile group) |
| 1 | P (P tile group) |
| 2 | I (I tile group) |

When nal_unit_type is equal to IRAP_NUT, i.e., the picture is an IRAP picture, tile_group_type shall be equal to 2.

tile_group_pic_order_cnt_lsb specifies the picture order count modulo MaxPicOrderCntLsb for the current picture. The length of the tile_group_pic_order_cnt_lsb syntax element is log 2_max_pic_order_cnt_lsb_minus4+4 bits. The value of the tile_group_pic_order_cnt_lsb shall be in the range of 0 to MaxPicOrderCntLsb−1, inclusive.

offset_len_minus1 plus 1 specifies the length, in bits, of the entry_point_offset_minus1[i] syntax elements. The value of offset_len_minus1 shall be in the range of 0 to 31, inclusive.

entry_point_offset_minus1[i] plus 1 specifies the i-th entry point offset in bytes, and is represented by offset_len_minus1 plus 1 bits. The tile group data that follow the tile group header consists of num_tiles_in_tile_group_minus1+1 subsets, with subset index values ranging from 0 to num_tiles_in_tile_group_minus1, inclusive. The first byte of the tile group data is considered byte 0. When present, emulation prevention bytes that appear in the tile group data portion of the coded tile group NAL unit are counted as part of the tile group data for purposes of subset identification. Subset 0 consists of bytes 0 to entry_point_offset_minus1 [0], inclusive, of the coded tile group data, subset k, with k in the range of 1 to num_tiles_in_tile_group_minus1−1, inclusive, consists of bytes firstByte[k] to lastByte[k], inclusive, of the coded tile group data with firstByte[k] and lastByte[k] defined as:

$$firstByte[k] = \sum_{n=1}^{k}(entry\_point\_offset\_minus1[n-1]+1)$$

lastByte[k]=firstByte[k]+entry_point_offset_minus1[k]

The last subset (with subset index equal to num_tiles_in_tile_group_minus1) consists of the remaining bytes of the coded tile group data.

Each subset shall consist of all coded bits of all CTUs in the tile group that are within the same tile.

In an embodiment, the tile group may include a tile group header and tile group data. When the tile group address is known, individual positions of respective CTUs in the tile group may be mapped and decoded. Table 6 below shows an example of syntax of tile group data.

TABLE 6

| tile_group_data( ) { | Descriptor |
|---|---|
| tileIdx = tile_group_address | |
| for( i = 0; i <= num_tiles_in_tile_group_minus1; i++, | |
| tileIdx++ ) { | |
| ctbAddrInTs = FirstCtbAddrTs[ tileIdx ] | |
| for( j = 0; j < NumCtusInTile[ tileIdx ]; j++, | |
| ctbAddrInTs++ ) { | |
| CtbAddrInRs = CtbAddrTsToRs[ ctbAddrInTs ] | |
| coding_tree_unit( ) | |
| } | |
| end_of_tile_one_bit /* equal in 1 */ | ae(v) |
| if( i < num_tiles_in_tile_ group_minus1 ) | |
| byte_alignment( ) | |
| } | |
| } | |

The following shows an example of English semantics for the syntax of the tile group data.

\<English Semantics for Syntax of Tile Group Data\>

Where the semantics are:
The list ColWidth[ i ] for i ranging from 0 to num_tile_columns_minus1, inclusive, specifying the width of the i-th tile column in units of CTBs, is derived as follows:
if( uniform_tile_spacing_flag )
for( i = 0; i <= num_tile_columns_minus1; i++ )
ColWidth[ i ] = ( ( i + 1 ) * PicWidthInCtbsY ) / ( num_tile_columns_minus1 + 1 ) − ( i * PicWidthInCtbsY ) / ( num_tile_columns_minus1 + 1 )
else {
ColWidth[ num_tile_columns_minus1 ] = PicWidthInCtbsY
for( i = 0; i < num_tile_columns_minus1; i++ ) {
ColWidth[ i ] = tile_column_width_minus1[ i ] + 1
ColWidth[ num_tile_columns_minus1 ] −= ColWidth[ i ]
}
}
The list RowHeight[ j ] for j ranging from 0 to num_tile_rows_minus1, inclusive, specifying the height of the j-th tile row in units of CTBs, is derived as follows:
if( uniform_tile_spacing_flag )
for( j = 0; j <= num_tile_rows_minus1; j++ )
RowHeight[ j ] = ( ( j + 1 ) * PicHeightInCtbsY ) / ( num_tile_rows_minus1 + 1 ) − ( j * PicHeightInCtbsY ) / ( num_tile_rows_minus1 + 1 )
else {
RowHeight[ num_tile_rows_minus1 ] = PicHeightInCtbsY
for( j = 0; j < num_tile_rows_minus1; j++ ) {
RowHeight[ j ] = tile_row_height_minus1[ j ] + 1
RowHeight[ num_tile_rows_minus1 ] −= RowHeight[ j ]
}
}
The list ColBd[ i ] for i ranging from 0 to num_tile_columns_minus1 + 1, inclusive, specifying the location of the i-th tile column boundary in units of CTBs, is derived as follows:
for( ColBd[ 0 ] = 0, i = 0; i <= num_tile_columns_minus1; i++ )
ColBd[ i + 1 ] = ColBd[ i ] + ColWidth[ i ]
The list RowBd[ j ] for j ranging from 0 to num_tile_rows_minus1 + 1, inclusive, specifying the location of the j-th tile row boundary in units of CTBs, is derived as follows:
for( RowBd[ 0 ] = 0, j = 0; j <= num_tile_rows_minus1; j++ )
RowBd[ j + 1 ] = RowBd[ j ] + RowHeight[ j ]
The list CtbAddrRsToTs[ ctbAddrRs ] for ctbAddrRs ranging from 0 to PicSizeInCtbsY − 1, inclusive, specifying the conversion from a CTB address in CTB raster scan of a picture to a CTB address in tile scan, is derived as follows:
for( ctbAddrRs = 0; ctbAddrRs < PicSizeInCtbsY; ctbAddrRs++ ) {
tbX = ctbAddrRs % PicWidthInCtbsY
tbY = ctbAddrRs / PicWidthInCtbsY

```
for( i = 0; i <= num_tile_columns_minus1; i++ )
if( tbX >= ColBd[ i ] )
tileX = i
for( j = 0; j <= num_tile_rows_minus1; j++ )
if( tbY >= RowBd[ j ] )
tileY = j
CtbAddrRsToTs[ ctbAddrRs ] = 0
for( i = 0; i < tileX; i++ )
CtbAddrRsToTs[ ctbAddrRs ] += RowHeight[ tileY ] * ColWidth[ i ]
for( j = 0; j < tileY; j++ )
CtbAddrRsToTs[ ctbAddrRs ] += PicWidthInCtbsY * RowHeight[ j ]
CtbAddrRsToTs[ ctbAddrRs ] += ( tbY − RowBd[ tileY ] ) * ColWidth[ tileX ] +
tbX − ColBd[ tileX ]
}
The list CtbAddrTsToRs[ ctbAddrTs ] for ctbAddrTs ranging from 0 to PicSizeInCtbsY
− 1, inclusive, specifying the conversion from a CTB address in tile scan to a CTB
address in CTB raster scan of a picture, is derived as follows:
for( ctbAddrRs = 0; ctbAddrRs < PicSizeInCtbsY; ctbAddrRs++ )
CtbAddrTsToRs[ CtbAddrRsToTs[ ctbAddrRs ] ] = ctbAddrRs
The list TileId[ ctbAddrTs ] for ctbAddrTs ranging from 0 to PicSizeInCtbsY − 1,
inclusive, specifying the conversion from a CTB address in tile scan to a tile ID, is
derived as follows:
for( j = 0, tileIdx = 0; j <= num_tile_rows_minus1; j++ )
for( i = 0; i <= num_tile_columns_minus1; i++, tileIdx++ )
for( y = RowBd[ j ]; y < RowBd[ j + 1 ]; y++ )
for( x = ColBd[ i ]; x < ColBd[ i + 1 ]; x++ )
TileId[ CtbAddrRsToTs[ y * PicWidthInCtbsY+ x ] ] = tileIdx
The list NumCtusInTile[ tileIdx ] for tileIdx ranging from 0 to PicSizeInCtbsY − 1,
inclusive, specifying the conversion from a tile index to the number of CTUs in the tile,
is derived as follows:
for( j = 0, tileIdx = 0; j <= num_tile_rows_minus1; j++ )
for( i = 0; i <= num_tile_columns_minus1; i++, tileIdx++ )
NumCtusInTile[ tileIdx ] = ColWidth[ i ] * RowHeight[ j ]
The list FirstCtbAddrTs[ tileIdx ] for tileIdx ranging from 0 to NumTilesInPic − 1,
inclusive, specifying the conversion from a tile ID to the CTB address in tile scan of
the first CTB in the tile are derived as follows:
for( ctbAddrTs = 0, tileIdx = 0, tileStartFlag = 1; ctbAddrTs < PicSizeInCtbsY;
ctbAddrTs++ ) {
if( tileStartFlag ) {
FirstCtbAddrTs[ tileIdx ] = ctbAddrTs
tileStartFlag = 0
}
tileEndFlag = ctbAddrTs = = PicSizeInCtbsY − 1 | | TileId[ ctbAddrTs +
1 ] != TileId[ ctbAddrTs ]
if( tileEndFlag ) {
tileIdx++
tileStartFlag = 1
}
}
```

The values of ColumnWidthInLumaSamples[i], specifying the width of the i-th tile column in units of luma samples, are set equal to ColWidth[i]<<CtbLog 2SizeY for i ranging from 0 to num_tile_columns_minus1, inclusive.

The values of RowHeightInLumaSamples[j] specifying the height of the j-th tile row in units of luma samples, are set equal to RowHeight[j]<<CtbLog 2SizeY for j ranging from 0 to num_tile_rows_minus1, inclusive.

In an embodiment, in relation to a use case and application of tiles, there may be various application examples requiring partition of a picture.

In an example, parallel processing will be discussed. Implementations executed on multi-core CPUs may require that a source picture be partitioned into tiles and tile groups. Each tile group may be processed in parallel on a separate core. The parallel processing may be beneficial to high-resolution real-time encoding of videos. Additionally, the parallel processing may reduce information sharing between tile groups, thereby reducing memory constraints. Since tiles may be distributed to different threads during parallel processing, parallel architecture may benefit from this partitioning mechanism.

In another example, a maximum transmission unit (MTU) size matching will be discussed. The coded pictures transmitted through the network may be subjected to fragmentation when the coded pictures are larger than the MTU size. Similarly, if the coded segments are small, the Internet Protocol (IP) header may become important. The packet fragmentation may result in loss of error resiliency. Partitioning the picture into tiles and packing each tile/tile group into a separate packet to mitigate the effects of the packet fragmentation may ensure that the packet is smaller than the MTU size.

In another example, the error resilience will be discussed. Error resilience may be motivated by requirements of some applications to apply Unequal Error Protection (UEP) to coded tile groups.

In an embodiment, explicit uniform signaling for picture partitioning may be proposed. In other words, explicit signaling of information on tile columns and tile rows for uniform spacing may be proposed. Table 7 below shows an example which is partially extracted syntax of the PPS level, and Table 8 below shows an example of semantics for the partially extracted syntax.

TABLE 7

| pic_parameter_set_rbsp( ) { | Descriptor |
|---|---|
| ... | |
| single_tile_in_pic_flag | u(1) |
| if( !single_tile_in_pic_flag ) { | |
| uniform_tile_spacing_flag | u(1) |
| if( uniform_tile_spacing_flag ) { | |
| tile_cols_width_minus1 | ue(v) |
| tile_rows_height_minus1 | ue(v) |
| } else { | |
| num_tile_columns_minus1 | ue(v) |
| num_tile_rows_minus1 | ue(v) |
| for( i = 0; i < num_tile_columns_minus1; i++ ) | |
| tile_column_width_minus1[ i ] | ue(v) |
| for( i = 0; i < num_tile_rows_minus1; i++ ) | |
| tile_row_height_minus1[ i ] | ue(v) |
| } | |
| ... | |

TABLE 8 single_tile_in_pic_flag equal to 1 specifies that there is only one tile in each picture
referring to the PPS. single_tile_in_pic_flag equal to 0 specifies that there is more
than one tile is each picture referring to the PPS.NOTE - In absence of further brick
splitting within a tile, the whole tile is referred to as a brick. When a picture contains
only a single tile without further brick splitting, it is referred to as a single brick. It is a
requirement of bitstream conformance that the value of single_tile_in_pic_flag shall
be the same for all PPSs that are activated within a CVS.
uniform_tile_spacing_flag equal to 1 specifies that tile column boundaries and
likewise tile row boundaries are distributed uniformly across the picture and signalled
using the syntax elements tile_cols_width_minus1 and tile_rows_height_minus1.
uniform_tile_spacing_flag equal to 0 specifies that tile column boundaries and
likewise tile row boundaries may or may not be distributed uniformly across the
picture and signalled using the syntax elements num_tile_columns_minus1 and
num_tile_rows_minus1 and a list of syntax element pairs
tile_column_width_minus1[ i ] and tile_row_height_minus1[ i ]. When not present,
the value of uniform_tile_spacing_flag is inferred to be equal to 1.
tile_cols_width_minus1 plus 1 specifies the width of the tile columns excluding the
right-most tile column of the picture in units of CTBs when
uniform_tile_spacing_flag is equal to 1. The value of tile_cols_width_minus1 shall be
in the range of 0 to PicWidthInCtbsY − 1, inclusive.
tile_rows_height_minus1 plus 1 specifies the height of the tile rows excluding the
bottom tile row of the picture in units of CTBs when uniform_tile_spacing_flag is
equal to 1. The value of tile_rows_height_minus1 shall be in the range of 0 to
PicHeightInCtbsY − 1, inclusive.
num_tile_columns_minus1 plus 1 specifies the number of tile columns partitioning
the picture when uniform_tile_spacing_flag is equal to 0. The value of
num_tile_columns_minus1 shall be in the range of 0 to PicWidthInCtbsY − 1,
inclusive. If single_tile_in_pic_flag is equal to 1, the value of
num_tile_columns_minus1 is inferred to be equal to 0. Otherwise, when
uniform_tile_spacing_flag is equal to 1, the value of num_tile_columns_minus1 is
inferred.
num_tile_rows_minus1 plus 1 specifies the number of tile rows partitioning the
picture when uniform_tile_spacing_flag is equal to 0. The value of
num_tile_rows_minus1 shall be in the range of 0 to PicHeightInCtbs − 1, inclusive.
If single_tile_in_pic_flag is equal to 1, the value of num_tile_rows_minus1 is inferred
to be equal to 0. Otherwise, when uniform_tile_spacing_flag is equal to 1, the value of
num_tile_rows_minus1 is inferred. The variable NumTilesInPic is set equal to
( num_tile_columns_minus1 + 1 ) * ( num_tile_rows_minus1 + 1 ).When
single_tile_in_pic_flag is equal to 0, NumTilesInPic shall be greater than 1.
tile_column_width_minus1[ i ] plus 1 specifies the width of the i-th tile column in
units of CTBs.
tile_row_height_minus1[ i ] plus 1 specifies the height of the i-th tile row in units of
CTBs.

In an embodiment, when there are a plurality of tiles in a picture, a syntax element uniform_tile_spacing_flag indicating whether or not to derive tiles having the same width and height by uniformly partitioning the picture may be parsed. The syntax element uniform_tile_spacing_flag may be used when indicating whether or not tiles in a picture are uniformly partitioned. When the syntax element uniform_tile_spacing_flag is enabled, the width of the tile column and the height of the tile row may be explicitly parsed. That is, the syntax element tile_cols_width_minus1 indicating the width of the tile column and the syntax element tile_rows_height_minus1 indicating the height of the tile row may be explicitly signaled and/or parsed.

In addition, the syntax elements num_tile_columns_minus1 and num_tile_rows_minus1 may be signaled and/or parsed. The syntax element num_tile_columns_minus1 may indicate the number of explicitly signaled tile columns when partitioning a picture into a plurality of tiles, based on explicitly signaled widths of tile columns. Alternatively, the syntax element num_tile_columns_minus1 may indicate the number of explicitly signaled tile columns, when partitioning a partial region in a picture into a plurality of tiles, based on the explicitly signaled widths of tile columns for the partial region. When the syntax element num_tile_columns_minus1 indicates the number of tile columns whose widths are signaled to partition a partial region in a picture into a plurality of tiles, the syntax element num_tile_columns_minus1 may be expressed as a syntax element num_exp_tile_columns_minus1.

Similarly, the syntax element num_tile_rows_minus1 may indicate the number of explicitly signaled tile rows, when partitioning a picture into a plurality of tiles, based on explicitly signaled heights of tile rows. Alternatively, the syntax element num_tile_rows_minus1 may indicate the number of explicitly signaled tile rows, when partitioning a partial region in a picture into a plurality of tiles, based on the explicitly signaled heights of tile rows for the partial region. When the syntax element num_tile_rows_minus1 indicates the number of tile columns whose heights are signaled to partition a partial region in a picture into a plurality of tiles, the syntax element num_tile_rows_minus1 may be expressed as a syntax element num_exp_tile_rows_minus1.

In an embodiment, said num_exp_tile_columns_minus1 (or num_tile_columns_minus1) may represent an example of information on the number of width parsing columns among a plurality of tile columns for deriving a tile partitioning structure in the current picture, whose information on width is parsed, and said num_exp_tile_rows_minus1 (or num_tile_rows_minus1) may represent an example of information on the number of height parsing rows among a plurality of rows for deriving a tile partition structure in the current picture, whose information on height is parsed. Information on the last width indicating a width among the widths of the width parsing columns, which is parsed last may be expressed as tile_column_width_minus1 [num_exp_tile_columns_minus1]+1 or tile_column_width_minus1 [num_tile_columns_minus1]+1 based on Table 6. Information on the last height indicating a height among the heights of the height-parsed rows, which is parsed last may be expressed as tile_row_height_minus1 [num_exp_tile_rows_minus1]+1 or tile_row_height_minus1 [num_tile_rows_minus1]+1 based on Table 6 above.

In an example, all the widths of the width parsing skip columns among the plurality of columns, whose information on the width is not parsed may be determined by the last width (e.g., said tile_column_width_minus1 [num_exp_tile_columns_minus1]+1 or tile_column_width_minus1 [num_tile_columns_minus1]+1), and all the heights of the height parsing skip rows among the plurality of rows, whose information on the height is not parsed may be determined by the last height (e.g., said tile_row_height_minus1 [num_exp_tile_rows_minus1]+1 or tile_row_height_minus1 [num_tile_rows_minus1]+1). More specifically, uniform spacing may be applied to widths of the width parsing skip columns and heights of the height parsing skip rows. In other words, without parsing uniform_tile_spacing_flag for determining whether or not to set tile spacing uniformly, a tile partitioning structure may be derived based on uniform spacing in some or all regions in the current picture. Those skilled in the relevant art may easily derive Table 9, Equation 1, and Equation 2 below from Table 7, based on this example.

TABLE 9

| pic_parameter_set_rbsp( ) { | Descriptor |
|---|---|
| ... | |
| no_pic_partition_flag | u(1) |
| if( !no_pic_partition_flag ) { | |
| pps_log2_ctu_size_minus5 | u(2) |
| num_exp_tile_columns_minus1 | ue(v) |
| num_exp_tile_rows_minus1 | ue(v) |
| for( i = 0; i <= num_exp_tile_columns_minus1; i++ ) | |
| tile_column_width_minus1[ i ] | ue(v) |
| for( i = 0; i <= num_exp_tile_rows_minus1; i++ ) | |
| tile_row_height_minus1[ i ] | ue(v) |

$remainingWidthInCtbsY = PicWidthInCtbsY$ [Equation 1]

for $(i = 0; i < $ num_exp_tile_columns_minus1$; i++)$ $\{(colWidth[i] = $ tile_column_width_minus[$i$] $+ 1$ $remainingWidthInCtbsY \mathrel{-}= colWidth[i]\}$ $uniformTileColWidth = $ tile_column_width _minus1[num_exp_tile_columns_minus1] $+ 1$ while $(remainingWidthInCtbsY >= uniformTileColWidth)$ $\{colWidth[i++] = uniformTileColWidth$ $remainingWidthInCtbsY \mathrel{-}= uniformTileColWidth\}$ if $(remainingWidthInCtbsY > 0)colWidth[i++] = $ $remainingWidthInCtbsY$ $NumTileColumns = i$ $remainingHeightInCtbsY = PicHeightInCtbsY$ [Equation 2]

for $(j = 0; j < $ num_exp_tile_rows_minus1$; j++)$ $\{RowHeight[j] = $ tile_row_height_minus[$j$] $+ 1$ $remainingHeightCtbsY \mathrel{-}= RowHeight[j]\}$ $uniformTileRowHeight = $ tile_row_height_minus1[num_exp_tile_rows_minus1] $+ 1$ while $(remainingHeightInCtbsY >= uniformTileRowHeight)$ $\{RowHeight[j++] = uniformTileRowHeight$ $remainingHeightInCtbsY \mathrel{-}= uniformTileRowHeight\}$ if $(remainingHeightInCtbsY > 0)RowHeight[j++] = $ $remainingHeightInCtbsY$ $NumTileColumns = j$ Referring to Table 9, num_exp_tile_columns_minus1 indicating the number of width parsing columns and num_exp_tile_rows_minus1 indicating the number of height parsing rows are parsed at the PPS level, and thereby, it may be confirmed that tile_column_width_minus1 [num_exp_tile_columns_minus1] indicating the last width and tile_row_height_minus1[num_exp_tile_rows_minus1] indicating the last height are parsed. Referring to Equation 1, it may be confirmed that tile_column_width_minus1 [num_exp_tile_columns_minus1] indicating the last width indicates the width of the uniform tile column (uniformTileColWidth), and referring to Equation 2, it may be confirmed that tile_row_height_minus1[num_exp_tile_rows_minus1] indicating the last height indicates the height of the uniform tile row (uniformTileRowHeight).

In an embodiment, after the process of partitioning the picture into tiles is performed, the process of partitioning the picture into bricks may be performed. First, a brick partitioning process may be started based on brick_splitting_present_flag indicating whether or not one or more tiles of pictures making reference to the PPS can be partition into two or more bricks. Next, for each tile in the picture, a flag indicating whether or not the tile can be partitioned into bricks may be parsed. If a tile can be partitioned into bricks, it may be determined whether or not the tile can be divided uniformly. If uniform_brick_spacking_flag can be parsed and uniform_brick_spacking_flag is enabled, then the height of a bricks row may be explicitly parsed. If the tiles are not uniformly partitioned, the height of each brick row may be parsed for each brick.

Additionally, single_brick_per_slice_flag may be parsed. single_brick_per_slice_flag may indicate whether or not each slice making reference to the PPS includes one brick. If each slice does not include one brick, a rectangular slice flag may be parsed. If the value of rect_slice_flag is 1 (or true) and there are a plurality of bricks in one slice, then num_slices_in_pic_minus1 indicating the number of slices in the picture may be parsed. Next, for each slice in the picture, a delta corresponding to the difference between the index of the top-left brick and the index number may be parsed.

An example of a syntax representing the brick structure may be as in Table 10 below, and an example of semantics for a syntax representing the brick structure may be as in Table 11 below.

TABLE 10

| pic_parameter_set_rbsp( ) { | Descriptor |
|---|---|
| pps_pic_parameter_set_id | ue(v) |
| pps_seq_parameter_set_id | ue(v) |
| single_tile_in_pic_flag | u(1) |
| if( !single tile in pic flag ) { | |
| uniform_tile_spacing_flag | u(1) |
| if( uniform_tile_spacing_flag ) { | |
| tile_cols_width_minus1 | ue(v) |
| tile_rows_height_minus1 | ue(v) |
| } else { | |
| num_tile_columns_minus1 | ue(v) |
| num_tile_rows_minus1 | ue(v) |
| for( i = 0; i < num_tile_columns_minus1; i++ ) | |
| tile_column_width_minus1[ i ] | ue(v) |
| for( i = 0; i < num_tile_rows_minus1; i++ ) | |
| tile_row_height_minus1[ i ] | ue(v) |
| } | |
| brick_splitting_present_flag | u(1) |
| for( i = 0; brick_present_flag && i < NumTilesInPic; i++ ) { | |
| brick_split_flag[ i ] | u(1) |

TABLE 10-continued

| pic_parameter_set_rbsp( ) { | Descriptor |
|---|---|
| if( brick_split_flag[ i ] ) { | |
| uniform_brick_spacing_flag[ i ] | u(1) |
| if( uniform_brick_spacing_flag[ i ] ) | |
| brick_rows_height_minus1[ i ] | ue(v) |
| else { | |
| num_brick_rows_minus1[ i ] | ue(v) |
| for( j = 0; j < num_brick_rows_minus1[ i ]; j++ ) | |
| brick_row_height_minus1[ i ][ j ] | ue(v) |
| } | |
| } | |
| } | |
| single_brick_per_slice_flag | u(1) |
| if( !single_brick_per_slice_flag ) | |
| rect_slice_flag | u(1) |
| if( rect_slice_flag && !single_brick_per_slice_flag ) { | |
| num_slices_in_pic_minus1 | ue(v) |
| for( i = 0; i <= num_slices_in_pic_minus1; i++ ) { | |
| if( i > 0 ) | |
| top_left_brick_idx[ i ] | u(v) |
| bottom_right_brick_idx_delta[ i ] | u(v) |
| } | |
| } | |
| loop_filter_across_bricks_enabled_flag | u(1) |
| if( loop_filter_across_bricks_enabled_flag ) | |
| loop_filter_across_slices_enabled_flag | u(1) |
| } | |
| if( rect_slice_flag ) { | |
| signalled_slice_id_flag | u(1) |
| if( signalled_slice_id_flag ) { | |
| signalled_slice_id_length_minus1 | ue(v) |
| for( i = 0; i <= num_slices_in_pic_minus1; i++ ) | |
| slice_id[ i ] | u(v) |
| } | |
| } | |
| ... | |
| } | |

TABLE 11 brick_splitting_present_flag equal to 1 specifies that one or more tiles of pictures referring to the PPS may be divided into two or more bricks.
brick_splitting_present_flag equal to 0 specifies that no tiles of pictures referring to the PPS are divided into two or more bricks.
brick_split_flags[ i ] equal to 1 specifies that the i-th tile is divided into two or more bricks. brick_split_flag[ i ] equal to 0 specifies that the i-th tile is not divided into two or more bricks. When not present, the value of brick_split_flag[ i ] is inferred to be equal to 0.
uniform_brick_spacing_flag[ i ] equal to 1 specifies that brick row boundaries are distributed uniformly across the i-th tile and signalled using the syntax element brick_rows_height_minus1[ i ]. uniform_brick_spacing_flag[ i ] equal to 0 specifies that brick row boundaries may or may not be distributed uniformly across i-th tile and signalled using the syntax element num_brick_rows_minus1[ i ] and a list of syntax elements brick_row_height_minus1[ i ][ j ]. When not present, the value of uniform_brick_spacing_flag[ i ] is inferred to be equal to 1.
brick_rows_height_minus1[ i ] plus 1 specifies the height of the brick rows excluding the bottom brick row in the i-th tile in units of CTBs when uniform_brick_spacing_flag[ i ] is equal to 1. When present, the value of brick_rows_height_minus1 shall be in the range of 0 to RowHeight[ i ] − 2, inclusive.
num_brick_rows_minus1[ i ] plus 1 specifies the number of brick rows partitioning the i-th tile when uniform_brick_spacing_flag[ i ] is equal to 0. When present, the value of num_brick_rows_minus1[ i ] shall be in the range of 1 to RowHeight[ i ] − 1, inclusive. If brick_split_flag[ i ] is equal to 0, the value of num_brick_rows_minus1[ i ] is inferred to be equal to 0. Otherwise, when uniform_brick_spacing_flag[ i ] is equal to 1, the value of num_brick_rows_minus1[ i ] is inferred.
brick_row_height_minus1[ i ][ j ] plus 1 specifies the the height of the j-th brick row in the i-th tile in units of CTBs when uniform_tile_spacing_flag is equal to 0. The following variables are derived, and, when uniform_tile_spacing_flag is equal to 1, the values of num_tile_columns_minus1 and num_tile_rows_minus1 are inferred, and, for each i ranging from 0 to NumTilesInPic − 1, inclusive, when uniform_brick_spacing_flag[ i ] is equal to 1, the value of num_brick_rows_minus1[ i ] is inferred, by invoking the CTB raster and brick scanning conversion process:- the list RowHeight[ j ] for j ranging from 0 to num_tile_rows_minus1, inclusive, specifying the height of the j-th tile row in units of

TABLE 11-continued

CTBs,- the list CtbAddrRsToBs[ ctbAddrRs ] for ctbAddrRs ranging from 0 to PicSizeInCtbsY − 1, inclusive, specifying the conversion from a CTB address in the CTB raster scan of a picture to a CTB address in the brick scan,- the list CtbAddrBsToRs[ ctbAddrBs ] for ctbAddrBs ranging from 0 to PicSizeInCibsY − 1, inclusive, specifying the conversion from a CTB address in the brick scan to a CTB address in the CTB raster scan of a picture,- the list BrickId[ ctbAddrBs ] for ctbAddrBs ranging from 0 to PicSizeInCtbsY − 1, inclusive, specifying the conversion from a CTB address in brick scan to a brick ID,- the list NumCtusInBrick[ brickIdx ] for brickIdx ranging from 0 to NumBricksInPic − 1, inclusive, specifying the conversion from a brick index to the number of CTUs in the brick,- the list FirstCtbAddrBs[ brickIdx ] for brickIdx ranging from 0 to NumBricksInPic − 1, inclusive, specifying the conversion from a brick ID to the CTB address in brick scan of the first CTB to the brick.
single_brick_per_slice_flag equal to 1 specifies that each slice that refers to this PPS includes one brick. single_brick_per_slice_flag equal to 0 specifies that a slice that refers to this PPS may include more than one brick. When not present, the value of single_brick_per_slice_flag is inferred to be equal to 1.
rect_slice_flag equal to 0 specifies that bricks within each slice are in raster scan order and the slice information is not signalled to PPS. rect_slice_flag equal to 1 specifies that bricks within each slice cover a rectangular region of the picture and the slice information is signalled in the PPS. When single_brick_per_slice_flag is equal to 1 rect_slice_flag is inferred to be equal to 1.
num_slices_in_pic_minus1 plus 1 specifies the number of slices to each picture referring to the PPS. The value of num_slices_in_pic_minus1 shall be in the range of 0 to NumBricksInPic − 1, inclusive. When not present and single_brick_per_slice_flag is equal to 1, the value of num_slices_in_pic_minus1 is inferred to be equal to NumBricksInPic − 1.
top_left_brick_idx[ i ] specifies the brick index of the brick located at the top-left corner of the i-th slice. The value of top_left_brick_idx[ i ] shall not be equal to the value of top_left_brick_idx[ j ] for any i not equal to j. When not present, the value of top_left_brick_idx[ i ] is inferred to be equal to i. The length of the top_left_brick_idx[ i ] syntax element is Ceil( Log2( NumBricksInPic ) bits.
bottom_right_brick_idx_delta[ i ] specifies the difference between the brick index of the brick located at the bottom-right corner of the i-th slice and top_left_brick_idx[ i ]. When single_brick_per_slice_flag is equal to 1, the value of bottom_right_brick_idx_delta[ i ] is inferred to be equal to 0. The length of the bottom_right_brick_idx_delta[ i ] syntax element is Ceil( Log2( NumBricksInPic - top_left_brick_idx[ i ] ) ) bits. It is a requirement of bitstream conformance that a slice shall include either a number of complete tiles or only a subset of one tile. The variable NumBricksInSlice[ i ] and BricksToSliceMap[ j ], which specify the number of bricks in the i-th slice and the mapping of bricks to slices, are derived as follows:NumBricksInSlice[ i ] = 0botRightBkIdx = top_left_brick_idx[ i ] + bottom_right_brick_idx_delta[ i ]for( j = 0; j < NumBricksInPic: j++) { if( BrickColBd[ j ] >= BrickColBd[ top_left_brick_idx[ i ] ] && BrickColBd[ j ] <= BrickColBd[ botRightBkIdx ] && BrickRowBd[ j ] >= BrickRowlBd[ top_left_brick_idx[ i ] ] && BrickRowBd[ j ] <= BrickColBd[ botRightBkIdx ] ) { NumBricksInSlice[ i ]++ BricksToSliceMap[ j ] = i ] }
loop_filter_across_bricks_enabled_flag equal to 1 specifies that in-loop filtering operations may be performed across brick boundaries in pictures referring to the PPS. loop_filter_across_bricks_enabled_flag equal to 0 specifies that in-loop filtering operations are not performed across brick boundaries in pictures referring to the PPS. The in-loop filtering operations include the deblocking filter, sample adaptive offset filter, and adaptive loop filter operations. When not present, the value of loop_filter_across_bricks_enabled_flag is inferred to be equal to 1.
loop_filter_across_slices_enabled_flag equal to 1 specifies that in-loop filtering operations may be performed across slice boundaries in pictures referring to the PPS. loop_filter_across_slice_enabled_flag equal to 0 specifies that in-loop filtering operations are not performed across slice boundaries in pictures referring to the PPS. The in-loop filtering operations include the deblocking filter, sample adaptive offset filter, and adaptive loop filter operations. When not present, the value of loop_filter_across_slices_enabled_flag is inferred to be equal to 0.
signalled_slice_id_flag equal to 1 specifies that the slice ID for each slice is signalled. signalled_slice_id_flag equal to 0 specifies that slice IDs are not signalled. When rect_slice_flag is equal to 0, the value of signalled_slice_id_flag is inferred to be equal to 0.
signalled_slice_id_length_minus1 plus 1 specifies ths number of bits used to represent the syntax element slice_id[ i ] when present, and the syntax element slice_address in slice headers. The value of signalled_slice_id_length_minus1 shall be in the range of 0 to 15, inclusive. When not present, the value of signalled_slice_id_length_minus1 is inferred to be equal to Ceil( Log2( num_slices_in_pic_minus1 + 1 ) ) − 1.
slice_id[ i ] specifies the slice ID of the i-th slice. The length of the slice_id[ i ] syntax element is signalled_slice_id_length_minus1 + 1 bits. When not present, the value of slice_id[ i ] is inferred to be equal to i, for each i in the range of 0 to num_slices_in_pic_minus1, inclusive.

The encoding apparatus and/or the decoding apparatus according to an embodiment may derive a first partitioning structure of the current picture, based on the partition information for the current picture (e.g., PPS information in Table 10), wherein the first partitioning structure of the current picture is based on a plurality of tiles.

An encoding apparatus and/or a decoding apparatus according to an embodiment may derive a second partitioning structure of the current picture, based on the partition information for the current picture, wherein the second partitioning structure of the current picture is based on a plurality of first partition units, and may derive a third partition structure of the current picture, based on the partition information for the current picture, wherein the third partitioning structure of the current picture is based on a plurality of second partition units. In this regard, one of the plurality of first partition units may be included in the one tile, include the one tile, or be the same as the one tile, One of the plurality of second partition units may be included in the one tile, include the one tile, be included in the first partition unit, include the first partition unit, or be the same as the one tile.

In an embodiment, the partition information for the current picture may include a rectangular partition unit flag indicating whether each of the plurality of first partition units has a rectangular shape. The rectangular partition unit flag may include rect_slice_flag of Table 9 above. The one first partition unit may include at least one of the plurality of second partition units. In an example, the first partition unit may be a slice, and the second partition unit may be a brick.

An encoding apparatus and/or a decoding apparatus according to an embodiment may parse information on the total number of the plurality of first partition units in the current picture, based on a determination that the value of the rectangular first partition unit flag is 1; and may parse information on the index delta value of said at least one second partition unit included in the one first partition unit. In an example, the index delta value may be bottom_right_brick_idx_delta of Table 9 above.

In an embodiment, the first partition unit may indicate the same unit as that of a slice, and the second partition unit may indicate the same unit as that of a tile. In another embodiment, the first partition unit may indicate the same unit as that of a slice, and the second partition unit may indicate the same unit as that of a brick. In still another embodiment, the first partition unit may indicate the same unit as that of a tile, and the second partition unit may indicate the same unit as that of a brick.

Figure 11:
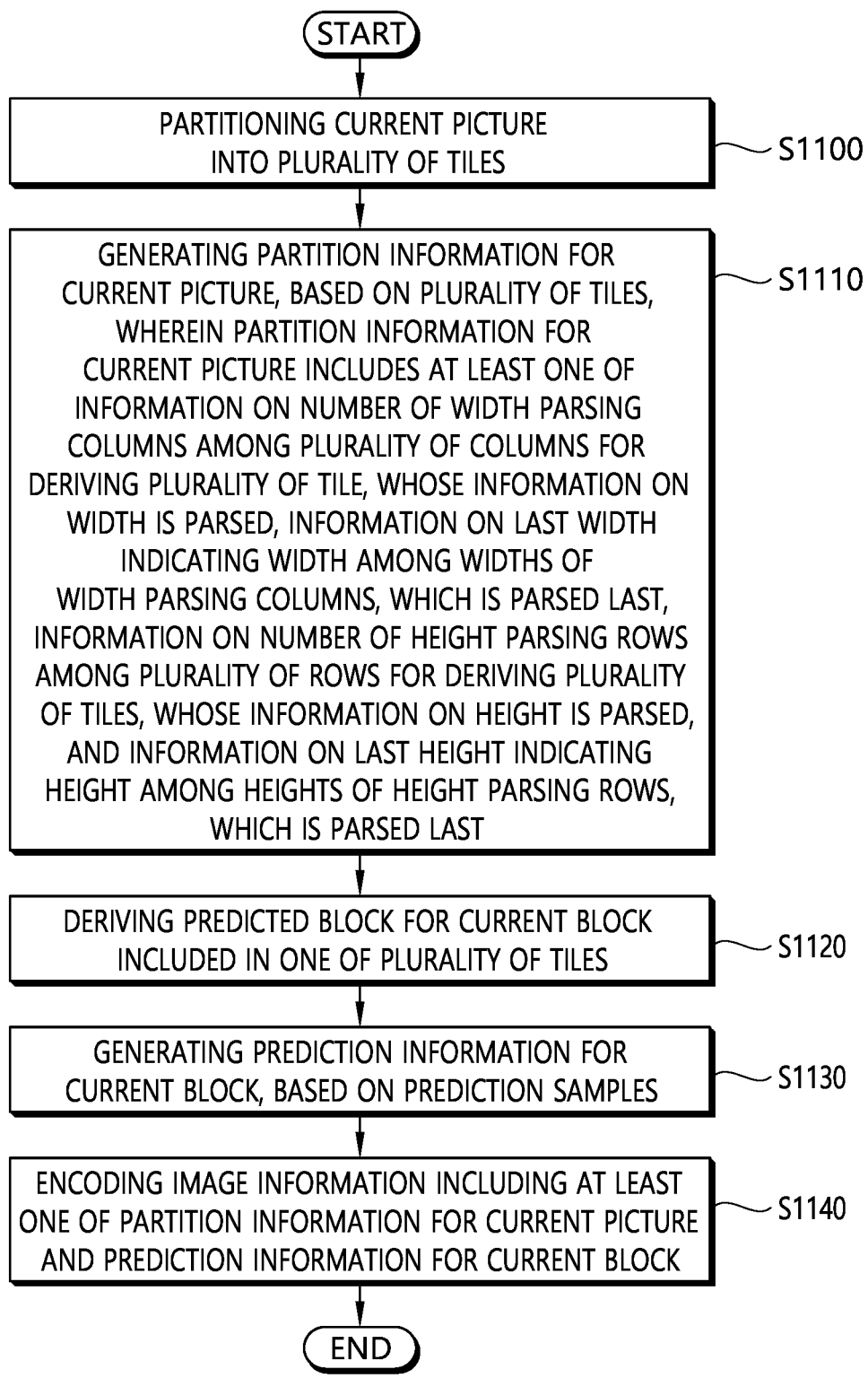
FIG. 11 is a flowchart showing operation of an encoding apparatus according to an embodiment.
Figure 12:
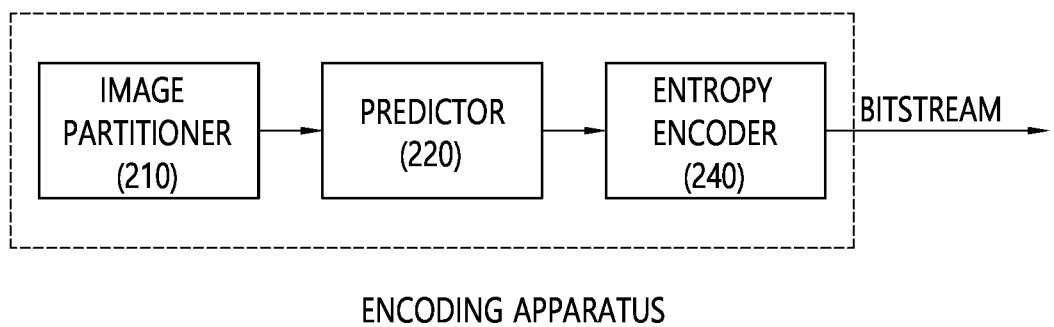
FIG. 12 is a block diagram showing a configuration of an encoding apparatus according to another embodiment.

FIG. 11 is a flowchart showing operation of an encoding apparatus according to an embodiment, and FIG. 12 is a block diagram showing configuration of an encoding apparatus according to an embodiment.

Figure 13:
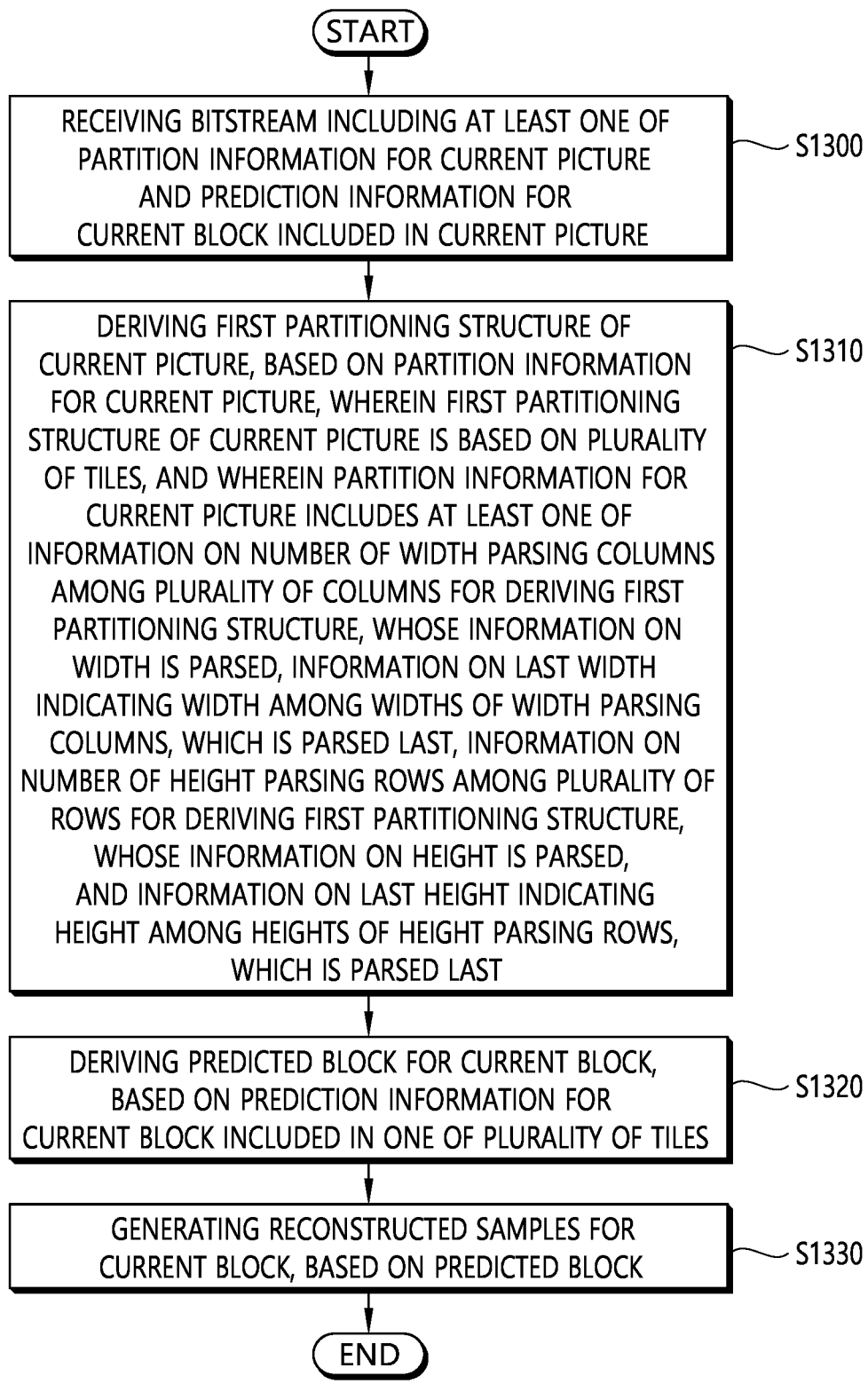
FIG. 13 is a flowchart showing operations of a decoding apparatus according to an embodiment.
Figure 14:
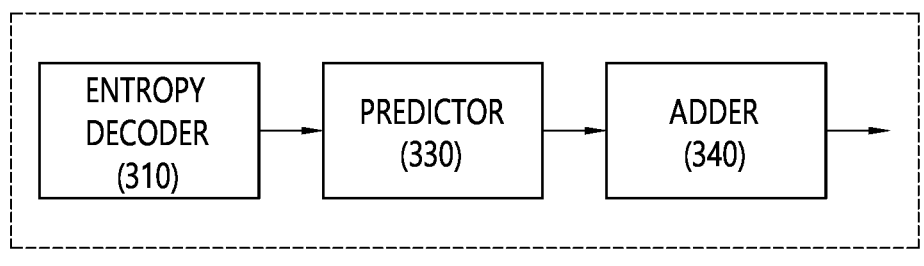
FIG. 14 is a block diagram showing a configuration of a decoding apparatus according to another embodiment.

The encoding apparatus according to FIGS. 11 and 12 may perform operations corresponding to those of a decoding apparatus according to FIGS. 13 and 14. Therefore, operations of the decoding apparatus to be described later in FIGS. 13 and 14 may be similarly applied to the encoding apparatus according to FIGS. 11 and 12.

Each step disclosed in FIG. 11 may be performed by the encoding apparatus 200 disclosed in FIG. 2. More specifically, S1100 and S1110 may be performed by the image partitioner 210 shown in FIG. 2; S1120 and S1130 may be performed by the predictor 220 shown in FIG. 2; and S1140 may be performed by the entropy encoder 240 disclosed in FIG. 2. Furthermore, operations according to S1100 to S1140 are based on some of contents described above in FIGS. 4 to 10. Therefore, an explanation for the specific content duplicated with contents described in FIGS. 2, and 4 to 10 above will be omitted or made briefly.

As shown in FIG. 12, the encoding apparatus according to an embodiment may include the image partitioner 210, the predictor 220 and the entropy encoder 240. However, in some cases, all of the components shown in FIG. 12 may not be essential components of the encoding apparatus, and the encoding apparatus may be implemented by more or less components than those shown in FIG. 12.

In the encoding apparatus according to an embodiment, the image partitioner 210, the predictor 220 and the entropy encoder 240 may be implemented by separate chips, or at least two or more components may be implemented by a single chip.

The encoding apparatus according to an embodiment may partition the current picture into a plurality of tiles (S1100). More specifically, the image partitioner 210 of the encoding apparatus may partition the current picture into a plurality of tiles.

An encoding apparatus according to an embodiment may generate a partition information for the current picture, based on the plurality of tiles, wherein the partition information for the current picture includes at least one of information on the number of width parsing columns among a plurality of columns for deriving the plurality of tile, whose information on width is parsed, information on a last width indicating a width among the widths of the width parsing columns, which is parsed last, information on the number of height parsing rows among a plurality of rows for deriving the plurality of tiles, whose information on height is parsed, and information on a last height indicating a height among the heights of the height parsing rows, which is parsed last (S1110). More specifically, the image partitioner 210 of the encoding apparatus may generate a partition information for the current picture, based on the plurality of tiles, wherein the partition information for the current picture includes at least one of information on the number of width parsing columns among a plurality of columns for deriving the plurality of tile, whose information on width is parsed, information on a last width indicating a width among the widths of the width parsing columns, which is parsed last, information on the number of height parsing rows among a plurality of rows for deriving the plurality of tiles, whose information on height is parsed, and information on a last height indicating a height among the heights of the height parsing rows, which is parsed last.

The encoding apparatus according to an embodiment may derive a predicted block for a current block included in one of the plurality of tiles (S1120). More specifically, the predictor 220 of the encoding apparatus may derive a predicted block for a current block included in one of the plurality of tiles.

The encoding apparatus according to an embodiment may generate prediction information for the current block, based on the prediction samples (S1130). More specifically, the predictor 220 of the encoding apparatus may generate prediction information for the current block based on the prediction samples.

An encoding apparatus according to an embodiment may encode image information including at least one of a partition information for the current picture and a prediction information for the current block (S1140). More specifically, the encoding apparatus may encode image information including at least one of a partition information for the current picture and a prediction information for the current block.

In an embodiment, all the widths of respective width parsing skip columns among the plurality of columns, whose information on the width is not parsed may be the same as the last width, and all the heights of respective height parsing skip rows among the plurality of rows, whose information on the height is not parsed may be the same as the last height.

In an embodiment, the total number of the width parsing skip columns and the height parsing skip rows may be derived based on the sum of the columns of the width parsing columns, the sum of the heights of the height parsing rows, the last width, and the last height.

The encoding apparatus according to an embodiment may partition the current picture into a plurality of first partition units, and partition the current picture into a plurality of second partition units.

In an embodiment, one of the plurality of first partition units may be included in the one tile, include the one tile, or be the same as the one tile; and one of the plurality of second partition units may be included in the one tile, include the one tile, be included in the first partition unit, include the first partition unit, or be the same as the one tile.

In an embodiment, the one first partition unit may include at least one of the plurality of second partition units.

The encoding apparatus according to an embodiment may encode information on the total number of the plurality of first partition units in the current picture, based on a determination that the plurality of first partition units have a rectangular shape, and information on the index delta value of the at least one second partition unit included in the one first partition unit may be encoded.

In an embodiment, the first partition unit may indicate the same unit as that of a slice, and the second partition unit may indicate the same unit as that of the one tile.

In an embodiment, the partition information for the current picture may be encoded at a PPS level.

According to the encoding apparatus of FIGS. 11 and 12 and the method of operation of the encoding apparatus, the encoding apparatus may partition the current picture into a plurality of tiles (S1100), may generate a partition information for the current picture, based on the plurality of tiles, wherein the partition information for the current picture includes at least one of information on the number of width parsing columns among a plurality of columns for deriving the plurality of tile, whose information on width is parsed, information on a last width indicating a width among the widths of the width parsing columns, which is parsed last, information on the number of height parsing rows among a plurality of rows for deriving the plurality of tiles, whose information on height is parsed, and information on a last height indicating a height among the heights of the height parsing rows, which is parsed last (S1110), may derive a predicted block for the current block included in one of the plurality of tiles (S1120); may generate prediction information for the current block, based on the predicted block (S1130); and may encode Image information including at least one of a partition information for the current picture and a prediction information for the current block (S1140).

That is, according to this disclosure, it is possible to increase the efficiency of picture partitioning. In addition, according to this disclosure, it is possible to increase the efficiency of picture partitioning, based on the partition information for the current picture. In addition, according to this disclosure, it is possible to improve signaling efficiency for picture partitioning by determining the width (or height) of each of length parsing skip tiles among a plurality of tiles constituting the current picture, whose information on width and height is not parsed, based on the last width (or height) among the signaled widths (or heights).

FIG. 13 is a flowchart showing operation of an decoding apparatus according to an embodiment, and FIG. 14 is a block diagram showing configuration of a decoding apparatus according to an embodiment.

Each of steps disclosed in FIG. 13 may be performed by the decoding apparatus 300 disclosed in FIG. 3. More specifically, S1300 and S1310 may be performed by the entropy decoder 310 disclosed in FIG. 3; S1320 may be performed by the predictor 330 disclosed in FIG. 3; and S1330 may be performed by the adder 340 disclosed in FIG. 3. Furthermore, operations according to S1300 to S1330 are based on some of contents described above in FIGS. 4 to 10. Therefore, an explanation for the specific content duplicated with contents described above in FIGS. 3 to 10 will be omitted or made briefly.

As shown in FIG. 14, the decoding apparatus according to an embodiment may include the entropy decoder 310, the predictor 330, and the adder 340. However, in some cases, all of the components shown in FIG. 14 may not be essential components of the decoding apparatus, and the decoding apparatus may be implemented by more or less components than those shown in FIG. 14.

In the decoding apparatus according to an embodiment, the entropy decoder 310, the predictor 330, and the adder 340 may be implemented by separate chips, or at least two or more components may be implemented by a single chip.

A decoding apparatus according to an embodiment may receive a bitstream including at least one of a partition information for a current picture and a prediction information for a current block included in the current picture (S1300). More specifically, the entropy decoder 310 of the decoding apparatus may receive a bitstream including at least one of segmentation information for a current picture and prediction information for a current block included in the current picture. In one example, the partition information may include at least one of information for partitioning the current picture into a plurality of tiles, information for partitioning the current picture into a plurality of slices, and information for partitioning the current picture into a plurality of bricks. The prediction information may include at least one of information on intra prediction for the current block, information on inter prediction, and information on Combined Inter Intra Prediction (CIIP).

A decoding apparatus according to an embodiment may derive a first partitioning structure of the current picture, based on the partition information for the current picture, wherein the first partitioning structure of the current picture is based on a plurality of tiles, and wherein the partition information for the current picture includes at least one of information on a number of width parsing columns among a plurality of columns for deriving the first partitioning structure, whose information on width is parsed, Information on a last width indicating a width among the widths of the width parsing columns, which is parsed last, Information on a number of height parsing rows among a plurality of rows for deriving the first partitioning structure, whose information on height is parsed, and information on a last height indicating a height among the heights of the height parsing rows, which is parsed last (S1310). More specifically, the entropy decoder 310 of the decoding apparatus may derive first partitioning structure of the current picture, based on the partition information for the current picture, wherein the first partitioning structure of the current picture is based on a plurality of tiles, and wherein the partition information for the current picture includes at least one of information on the number of width parsing columns among a plurality of columns for deriving the first partitioning structure, whose information on width is parsed, information on a last width indicating a width among the widths of the width parsing columns, which is parsed last, information on the number of height parsing rows among a plurality of rows for deriving the first partitioning structure, whose information on height is parsed, and information on a last height indicating a height among the heights of the height parsing rows, which is parsed last.

In one example, the information on the number of width parsing columns may be represented as num_tile_columns_minus1 or num_exp_tile_columns_minus1; the information on the last width may be represented as tile_column_width_minus1[num_tile_columns_minus1] or tile_column_width_minus1[num_exp_tile_columns_minus1]; the information on the height-parsed rows may be represented as num_tile_rows_minus1 or num_exp_tile_rows_minus1; and the information on the last width may represented as tile_row_height_minus1[num_tile_columns_minus1] or tile_row_height_minus1[num_exp_tile_columns_minus1].

A decoding apparatus according to an embodiment may derive a predicted block for the current block, based on the prediction information for the current block included in one of the plurality of tiles (S1320). More specifically, the predictor 330 of the decoding apparatus may derive a predicted block for the current block, based on the prediction information for the current block included in one of the plurality of tiles.

The decoding apparatus according to an embodiment may generate reconstructed samples for the current block, based on the predicted block (S1330). More specifically, the adder 340 of the decoding apparatus may generate reconstructed samples for the current block, based on the predicted block.

In an embodiment, all the widths of respective width parsing skip columns among the plurality of columns, whose information on the width is not parsed may be determined as the last width, and all the heights of respective height parsing skip rows among the plurality of rows, whose information on the height is not parsed may be determined as the last height. In an example, the number of width parsing skip columns may be derived by subtracting the number of width parsing columns from the total number of tile columns, and the number of height parsing skip rows may be derived by subtracting the number of height parsing rows from the total number of tile rows.

In an embodiment, the total number of the width parsing skip columns and the height parsing skip rows may be derived based on the sum of the columns of the width parsing columns, the sum of the heights of the height parsing rows, the last width, and the last height.

A decoding apparatus according to an embodiment may derive a second partition structure of the current picture, based on the partition information for the current picture, wherein the second partitioning structure of the current picture is based on a plurality of first partition units, and may derive a third partition structure of the current picture, based on the partition information for the current picture, wherein the third partitioning structure of the current picture is based on a plurality of second partition units. In this case, one of the plurality of first partition units may be included in the one tile, include the one tile, or be the same as the one tile; and one of the plurality of second partition units may be included in the one tile, include the one tile, be included in the first partition unit, include the first partition unit, or be the same as the one tile. In an example, the first partition unit may be a slice, and the second partition unit may be a brick.

In an embodiment, the partition information for the current picture may include a rectangular first partition unit flag indicating whether each of the plurality of first partition units has a rectangular shape, and the one first partition unit may include at least one of the plurality of second partition units. A decoding apparatus according to an embodiment may parse information on the total number of the plurality of first partition units in the current picture, based on a determination that the value of the rectangular first partition unit flag is 1; and may parse information on the index delta value of said at least one second partition unit included in the one first partition unit. In an example, the index delta value may indicate bottom_right_brick_idx_delta of Table 9 above.

In an example, if the first partition unit represents the same unit as that of a slice, then the rectangular first partition unit flag may be represented as rect_slice_flag, and information on the total number of the plurality of first partition units in the current picture may be represented as num_slices_in_pic_minus1.

In an embodiment, the first partition unit may indicate the same unit as that of a slice, and the second partition unit may indicate the same unit as that of the one tile. In another embodiment, the first partition unit may indicate the same unit as that of a slice, and the second partition unit may indicate the same unit as that of a brick. In still another embodiment, the first partition unit may indicate the same unit as that of a tile, and the second partition unit may indicate the same unit as that of a brick.

In an embodiment, the partition information for the current picture is parsed at a picture parameter set (PPS) level.

According to the decoding apparatus and the operation method of the decoding apparatus of FIGS. 13 and 14, the decoding apparatus may receive a bitstream including at least one of a partition information for a current picture and a prediction information for a current block included in the current picture (S1300); may derive a first partitioning structure of the current picture, based on the partition information for the current picture, wherein the first partitioning structure of the current picture is based on a plurality of tiles, and wherein the partition information for the current picture includes at least one of information on a number of width parsing columns among a plurality of columns for deriving the first partitioning structure, whose information on width is parsed, Information on a last width indicating a width among the widths of the width parsing columns, which is parsed last, Information on a number of height parsing rows among a plurality of rows for deriving the first partitioning structure, whose information on height is parsed, and information on a last height indicating a height among the heights of the height parsing rows, which is parsed last (S1310); may derive a predicted block for the current block, based on the prediction information for the current block included in one of the plurality of tiles (S1320); and may generate reconstructed samples for the current block based on the predicted block (S1330).

That is, according to this disclosure, it is possible to increase the efficiency of picture partitioning. In addition, according to this disclosure, it is possible to increase the efficiency of picture partitioning, based on the partition information for the current picture. In addition, according to this disclosure, it is possible to improve signaling efficiency for picture partitioning by determining the width (or height) of each of length parsing skip tiles among a plurality of tiles constituting the current picture, whose information on width and height is not parsed, based on the last width (or height) among the signaled widths (or heights).

Although methods have been described on the basis of a flowchart in which steps or blocks are listed in sequence in the above-described embodiments, the steps of the present disclosure are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present disclosure.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

The aforementioned method according to the present disclosure may be in the form of software, and the encoding apparatus and/or decoding apparatus according to the present disclosure may be included in a device for performing image processing, for example, a TV, a computer, a smart phone, a set-top box, a display device, or the like.

When the embodiments are implemented in software in the present disclosure, the aforementioned method may be implemented using a module (procedure, function, etc.) which performs the aforementioned function. The module may be stored in a memory and executed by a processor. The memory may be disposed to the processor internally or externally and connected to the processor using various well-known means. The processor may include application-specific integrated circuit (ASIC), other chipsets, logic circuits, and/or data processors. The memory may include a read-only memory (ROM), a random access memory (RAM), a flash memory, a memory card, storage media and/or other storage devices. That is, the embodiments described herein may be implemented and performed on a processor, a microprocessor, a controller, or a chip. For example, the functional units shown in each drawing may be implemented and performed on a computer, a processor, a microprocessor, a controller, or a chip. In this case, information for implementation (e.g., information on instructions) or an algorithm may be stored in a digital storage medium.

Further, the decoding apparatus and the encoding apparatus to which the present disclosure is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, camcorder, a video on demand (VoD) service provider, an over the top video (OTT) device, an internet streaming service provider, a 3D video device, a virtual reality (VR) device, an augment reality (AR) device, an image telephone video device, a vehicle terminal (e.g., a vehicle (including an autonomous vehicle) terminal, an airplane terminal, a ship terminal, etc.) and a medical video device, and the like, and may be used to process a video signal or a data signal. For example, the OTT video device may include a game console, a Blu-ray player, an Internet-connected TV, a home theater system, a smartphone, a tablet PC, a digital video recorder (DVR), and the like.

Further, the processing method to which the present disclosure is applied may be produced in the form of a program being executed by a computer and may be stored in a computer-readable recording medium. Multimedia data having a data structure according to the present disclosure may also be stored in the computer-readable recording medium. The computer readable recording medium includes all kinds of storage devices and distributed storage devices in which computer readable data is stored. The computer-readable recording medium may be, for example, a Blu-ray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (e.g., transmission over the Internet). Further, a bitstream generated by the encoding method may be stored in the computer-readable recording medium or transmitted through a wired or wireless communication network.

In addition, the embodiments of the present disclosure may be embodied as a computer program product based on a program code, and the program code may be executed on a computer by the embodiments of the present disclosure. The program code may be stored on a computer-readable carrier.

FIG. 15 represents an example of a content streaming system to which the disclosure of the present document may be applied.

Referring to FIG. 15, the content streaming system to which the embodiments of the present disclosure is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present disclosure is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the content streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the content streaming system may be operated as a distributed server, and in this case, data received by each server may be processed in distributed manner.

What is claimed is:

1. An image decoding method performed by a decoding apparatus, the method comprising:

obtaining image information including partition information, prediction information and residual information for a current block from a bitstream;

deriving a predicted block for the current block based on the prediction information for the current block included in one tile of a plurality of tiles;

deriving a residual block for the current block based on the residual information; and generating a reconstructed sample for the current block based on the predicted block and the residual block, wherein the image information includes a picture parameter set (PPS), wherein the plurality of tiles in a current picture are derived based on the partition information including information on a tile column width and information on a tile row height for an uniform tile spacing, wherein based on the uniform tile spacing being applied, width values of tile columns are derived based on the information on the tile column width and height values of tile rows are derived based on the information on the tile row height, and wherein the information on the tile column width and the information on the tile row height are included in the PPS.

2. The image decoding method of claim 1, wherein a value of the information on the tile column width plus one corresponds to each of width values of the tiles columns that the uniform tile spacing is applied, and wherein a value of the information on the tile row height plus one corresponds to each of height values of the tile rows that the uniform tile spacing is applied.

3. The image decoding method of claim 1, wherein the plurality of tiles in the current picture are derived according a first partitioning structure, wherein the method further comprising:

deriving a second partitioning structure of the current picture, based on the partition information for the current picture, wherein the second partitioning structure of the current picture is based on a plurality of first partition units; and deriving a third partitioning structure of the current picture, based on the partition information for the current picture, wherein the third partitioning structure of the current picture is based on a plurality of second partition units, wherein one first partition unit of the plurality of first partition units is included in the one tile, includes the one tile, or is a same as the one tile, and wherein one second partition unit of the plurality of second partition units is included in the one tile, includes the one tile, is included in the first partition unit, includes the first partition unit, or is a same as the one tile.

4. The image decoding method of claim 3, wherein the partition information for the current picture includes a rectangular first partition unit flag indicating whether each of the plurality of first partition units has a rectangular shape, and wherein the one first partition unit comprises at least one second partition unit of the plurality of second partition units, wherein the method further comprising:

parsing information on a total number of the plurality of first partition units in the current picture, based on a determination that a value of the rectangular first partition unit flag is 1; and parsing information on an index delta value of the at least one second partition unit included in the one first partition unit.

5. The image decoding method of claim 4, wherein the first partition unit represents a same unit as that of a slice, and wherein the second partition unit represents a same unit as that of the one tile.

6. An image encoding method performed by an encoding apparatus, the method comprising:

partitioning a current picture into a plurality of tiles;

generating partition information for the current picture based on the plurality of tiles;

deriving a predicted block by performing prediction for a current block included in one tile of the plurality of tiles;

generating prediction information for the prediction for the current block;

generating a residual block based on the predicted block;

generating residual information based on the residual block; and encoding image information including the partition information, the prediction information and the residual information, wherein the partition information includes information on a tile column width and information on a tile row height for an uniform tile spacing, wherein based on the uniform tile spacing being applied, width values of tile columns are derived based on the information on the tile column width and height values of tile rows are derived based on the information on the tile row height, and where the information on the tile column width and the information on the tile row height are configured in a picture parameter set (PPS).

7. The image encoding method of claim 6, wherein a value of the information on the tile column width plus one corresponds to each of width values of the tiles columns that the uniform tile spacing is applied, and wherein a value of the information on the tile row height plus one corresponds to each of height values of the tile rows that the uniform tile spacing is applied.

8. The image encoding method of claim 6, further comprising:

partitioning the current picture into a plurality of first partition units; and partitioning the current picture into a plurality of second partition units, wherein one first partition unit of the plurality of first partition units is included in the one tile, includes the one tile, or is a same as the one tile, and wherein one second partition unit of the plurality of second partition units is included in the one tile, includes the one tile, is included in the first partition unit, includes the first partition unit, or is a same as the one tile.

9. The image encoding method of claim 8, wherein the one first partition unit comprises at least one second partition unit of the plurality of second partition units, wherein the method comprising:
encoding information on a total number of the plurality of first partition units in the current picture, based on a determination that the plurality of first partition units has a rectangular shape; and
encoding information on an index delta value of the at least one second partition unit included in the one first partition unit.

10. The image encoding method of claim 9, wherein the first partition unit represents a same unit as that of a slice, and
wherein the second partition unit represents a same unit as that of the one tile.

11. A non-transitory computer-readable digital storage medium storing a bitstream generated by a method, the method comprising:
partitioning a current picture into a plurality of tiles;
generating partition information for the current picture based on the plurality of tiles;
deriving a predicted block by performing prediction for a current block included in one tile of the plurality of tiles;
generating prediction information for the prediction for the current block;
generating a residual block based on the predicted block;
generating residual information based on the residual block; and
encoding image information including the partition information, the prediction information and the residual information,
wherein the partition information includes information on a tile column width and information on a tile row height for an uniform tile spacing,
wherein based on the uniform tile spacing being applied, width values of tile columns are derived based on the information on the tile column width and height values of tile rows are derived based on the information on the tile row height, and
where the information on the tile column width and the information on the tile row height are configured in a picture parameter set (PPS).

* * * * *